United States Patent [19]

Garney

[11] Patent Number: 5,412,798
[45] Date of Patent: * May 2, 1995

[54] SYSTEM FOR ENABLING ACCESS TO DEVICE DRIVER RESIDING IN RESOURCE MEMORY CORRESPONDING TO COUPLED RESOURCE BY ALLOWING MEMORY MAPPING TO DEVICE DRIVER TO BE EXECUTED

[75] Inventor: John I. Garney, Aloha, Oreg.

[73] Assignee: Intel Corporation, Santa Clara, Calif.

[ * ] Notice: The portion of the term of this patent subsequent to Jun. 7, 2011 has been disclaimed.

[21] Appl. No.: 7,849

[22] Filed: Jan. 22, 1993

Related U.S. Application Data

[63] Continuation-in-part of Ser. No. 815,331, Dec. 27, 1991, Pat. No. 5,319,751.

[51] Int. Cl.[6] .............................................. G06F 15/40
[52] U.S. Cl. .................................... 395/500; 395/700; 364/231.5; 364/231.6; 364/247.3; 364/DIG. 1
[58] Field of Search ............... 395/200, 275, 375, 650, 395/700, 500; 364/231.5, 231.6, 247.3

[56] References Cited

U.S. PATENT DOCUMENTS

| | | | |
|---|---|---|---|
| 4,589,063 | 5/1986 | Shah et al. | 364/200 |
| 5,029,077 | 7/1991 | Fatahalian et al. | 364/200 |
| 5,109,510 | 4/1992 | Baker et al. | 395/650 |
| 5,136,712 | 8/1992 | Perazzoli et al. | 395/700 |
| 5,247,682 | 9/1993 | Kondou et al. | 395/700 |
| 5,265,252 | 11/1993 | Rawson et al. | 395/700 |
| 5,301,288 | 4/1994 | Newman et al. | 395/400 |
| 5,319,751 | 6/1994 | Garney | 395/200 |

OTHER PUBLICATIONS

Device Driver'stubs' Smooth Path to Top SCSI Performance, by Gibson Steve, Nov. 19, 1990.

"Subnotebook modem runs over 15 hours", Tuesday, Nov. 17, 1992, *COMDEX Daily*, p. 22.

*Primary Examiner*—Thomas C. Lee
*Assistant Examiner*—Moustafa Mohamed Meky
*Attorney, Agent, or Firm*—Blakely, Sokoloff, Taylor & Zafman

[57] ABSTRACT

Device drivers for removable system resources are configured dynamically in a computer system having a processor, a system memory and an interface for receiving removable system resources (generally denoted feature cards). A feature card has a card memory area which stores a device driver for controlling the feature card. The feature card device driver is separated into two parts: 1) a full device driver portion, and 2) a stub device driver portion. The full device driver provides all of the device driver functionality necessary to control each and every function of the feature card. The device driver stub is a small compact portion of processing logic for linking the full device driver with operating system software located in the computer system. A fixed amount of system memory RAM is set aside at bootstrap initialization to contain the device driver stubs. Device driver stubs corresponding to removed cards remain resident in system memory until a device driver stub cannot be loaded because the system memory set aside for device driver stubs has been filled. At that time, enough of the system memory set aside for device driver stubs is reclaimed to permit the desired device driver stub to be loaded. Therefore, by allocating enough space in computer system memory to contain every device driver stub required by the system at a given time, and by reclaiming system memory occupied by removed card device driver stubs as the system memory is needed, one can avoid having to periodically reset the system by performing a bootstrap initialization procedure.

18 Claims, 20 Drawing Sheets

DEVICE DRIVER INFORMATION
BLOCK (DDIB) HEADER

STUB HEADER
-540-

| DEVICE DRIVER LINKAGE INFORMATION | -630 |
|---|---|
| DEVICE DRIVER ATTRIBUTE INFORMATION | -632 |
| DEVICE DRIVER STRATEGY OFFSET | -634 |
| DEVICE DRIVER INTERRUPT OFFSET | -636 |
| DEVICE DRIVER UNITS AND NAME | -638 |

*Figure 6c*

STUB DATA
-542-

| POINTER TO PREVIOUS STUB BLOCK | -660 |
|---|---|
| POINTER TO NEXT STUB BLOCK | -662 |
| ADAPTER IDENTIFICATION | -664 |
| SOCKET IDENTIFICATION | -666 |
| DEVICE DRIVER STUB UNIQUE IDENTIFICATION | -668 |
| CARD INSERTION FLAG | -672 |
| DRIVER SPECIFIC DATA AREA | -674 |
| DATA AREA SIZE | -676 |
| CODE AREA SIZE | -678 |
| COMMAND | -680 |

*Figure 6d*

SYSTEM FOR ENABLING ACCESS TO DEVICE DRIVER RESIDING IN RESOURCE MEMORY CORRESPONDING TO COUPLED RESOURCE BY ALLOWING MEMORY MAPPING TO DEVICE DRIVER TO BE EXECUTED

RELATED APPLICATIONS

This application is a Continuation-in-part of U.S. patent application Ser. No. 07/815,331, filed Dec. 27, 1991, now U.S. Pat. No. 5,319,751, and entitled "Device Driver Configuration In a Computer System". The disclosure of the parent application, Ser. No. 07/815,331, filed Dec. 27, 1991, is hereby incorporated fully by reference.

BACKGROUND OF THE INVENTION

This application is related to: U.S. patent application Ser. No. 08/007,580, filed Jan, 22, 1993 (still pending), entitled "Fixed Size Device Driver Support Mechanism for Insertion and Removal of Removable Computer Cards", which is hereby incorporated fully by reference.

FIELD OF THE INVENTION

The present invention pertains to the field of computer systems. Specifically, the present invention relates to computer systems supporting an interface to removable system resources and the control of device drivers related thereto.

ART BACKGROUND

It is becoming increasingly important to design and build computer systems that can be dynamically configured without powering down the computer system or requiring the operating system program logic to be reset or bootstrap initialized. Dynamic configuration includes the ability to add or remove system resources or special feature capabilities while a computer system is operating. These system resources and special features include expansion memory boards, parallel or serial input/output (I/O) ports, read only memory (ROM) or flash memory expansion boards, computer network interface cards, modem cards, smart cards, or other removable system resources or special feature mechanisms.

Such removable system resources and special features are often implemented in the prior art using removable electronic feature cards adhering to the Personal Computer Memory Card International Association (PCMCIA), Sunnyvale, Calif., Release 2.0 standard. These PCMCIA feature cards generally comprise electronic microcircuits within a thin housing including a detachable multiple conductor interface with which the feature card may be removably inserted into a slot in a computer housing. Once inserted, a feature card is accessible to, and used by, the processor in the computer system. The use of feature cards allows a computer user to select specific features or resources from a variety of feature cards offered by a computer vendor. In this way, the computer user achieves the desired level of functionality without being required to purchase unnecessary resources or computer system capabilities. The overall cost of the computer system for a specific application is thereby optimized. The use of removable feature cards is particularly significant for portable computers or lap top computers where space constraints increase the need for system resource optimization. The design and use of hardware devices under the PCMCIA standard are well known in the art. It will be apparent to those skilled in the art that other implementations of removable system resources are possible.

Virtually all computer systems operate with some sort of operating system or software processing logic. The use of an operating system in a computer system is well-known in the art. The operating system is responsible for managing the processing and transfer of information between various system resources. One well known technique for managing these resources is the use of device drivers. Device drivers are software modules comprising processing logic for controlling the low level or device specific components of a particular computer system resource. For example, a device driver may be used for controlling a magnetic disk drive device coupled to a computer system. In this example, the device driver would control the various hardware specific registers, latches, signals, or other components of the magnetic disk drive device. Similarly, other computer system resources such as serial or parallel input/output (I/O) ports, modem devices, computer network interface devices, or memory expansion boards are controlled by device drivers.

In conventional computer systems, device drivers are typically loaded into random access memory (RAM) during bootstrap initialization of the computer system. Many prior art computer systems require that device drivers be loaded at initialization time in order for random access memory to be allocated properly. Depending upon the complexity of the device controlled by the device driver, the device driver itself may be relatively small or a very large device driver that consumes many thousands of bytes of random access memory. Thus, many prior art systems require that a full system configuration of resources be installed and available at bootstrap initialization time. If system resources or interfaces are subsequently added or removed from the system, the inability to access a newly installed resource or the errant access to a now unavailable system resource usually results. Other prior art computer systems require that the computer system be powered down while new system resources or features are added or removed from the system. Still other systems must at least be newly bootstrap loaded in order to gain access to a new configuration of system resources. Thus, prior art computer systems cannot be readily reconfigured to a new arrangement of system resources.

Because prior art systems typically require that a full system configuration of resources be established at initialization time, the tendency exists for any or all system resources that may conceivably be used while a computer system is powered up to be installed during the initialization process. This tendency leads to the installation of resources that are never used during a computing session. The loading and installation of unused system resources increases the time required for bootstrap initializing the system and reduces the available random access memory (RAM), because of the RAM space required by unused device drivers. It is, therefore, important to install in a computer system only those device drivers actually needed during a computing session. In some cases, it may not be possible to load all of the device drivers necessary because of the random access memory storage constraints.

Some computer systems in the prior art provide means for interfacing with removable electronic feature cards. In order to mitigate the disadvantages described above, some of these computer systems store associated device drivers on the removable electronic feature card itself. In this way, random access memory space within the computer system does not need to be allocated for storage of the device driver. Moreover, processing time during initialization is not consumed by having to load the device driver into random access memory. Systems that configure device drivers on the removable feature cards have the advantage of optimizing memory allocation requirements within the computer system.

Systems that configure device drivers on removable feature cards, however, have several important disadvantages. First, if a feature card is removed from the computer system, the device driver controlling the operation of the feature card becomes inaccessible to the computer system. In most cases, the computer system requires access to a device driver in order to properly terminate the operation of the device prior to removal of the feature card. Typically, the computer system does not have sufficient time to access the device driver prior to removal of the feature card. Thus, system errors often result from an improperly terminated system resource.

Other computer systems having means for interfacing with removable electronic feature cards provide a very limited capability for responding to insertion or removal of feature cards during post initialization operation of the computer system. Some computer systems do not recognize system resources connected to the computer system after the bootstrap initialization process has been completed. Other computer systems suspend or freeze the operation of the computer system if a system resource is removed after initialization is complete. Still other computer systems require that the system be powered down or the bootstrap initialization process be reinitiated if a new configuration of system resources is desired.

This application is a continuation-in-part of U.S. patent application Ser. No. 07/815,331, filed Dec. 27, 1991, and entitled "Device Driver Configuration In a Computer System". The disclosure of the parent application, Ser. No. 07/815,331, described a computer system having dynamic device driver configuration for removable system resources. In the computer system of the parent application, a feature card device driver is stored in a memory area of the card. The device driver is separated into two parts: 1) a full device driver portion, and 2) a stub device driver portion. The full device driver provides all of the device driver functionality necessary to control each and every function of the feature card. The device driver stub is a small compact portion of processing logic associated with the full device driver, but mainly responsible for linking the full device driver with operating system software located in the computer system.

Upon insertion of a card into the computer system, the device driver stub code image is read from the card memory area and transferred into an area of computer system memory. The device driver stub code is then executed by the processor of the computer system from computer system random access memory. Conversely, the full device driver code is not transferred to the computer system random access memory; rather, the full device driver is executed while still resident on the card. Upon execution, the device driver stub enables access to the full card resident device driver and allows memory mapping to the full device driver. The full device driver may then be activated by the processor.

When a card is removed from the computer system, the device driver stub disables access to the removed card by disallowing memory mapping to the removed card. The device driver stub is unlinked from the linked list of active device driver stubs and the card insertion flag is reset to indicate that the removable system resource has been decoupled from the computer system.

However, in the invention of the parent application, each device driver stub loaded into computer system memory remains resident in the computer system memory until the next time the system is bootstrap initialized. Therefore, while the invention of the parent application permits dynamic device driver configuration for removable computer system resources, the fact that the computer system has a finite amount of system memory places an upper limit upon the number of removable resources that can be used by the system before the system must be reset with a bootstrap initialization operation. The requirement that a system be reset is an undesirable feature because a system cannot be used while a bootstrap initialization is being performed. Furthermore, a bootstrap initialization operation destroys the contents of computer system memory. Therefore, any data residing in main memory will be lost if it had not been saved prior to the bootstrap operation.

Thus, a better means for dynamically configuring system resources in a computer system is needed.

SUMMARY OF THE INVENTION

A method and apparatus for a computer system having dynamic device driver configuration for removable system resources is disclosed. The computer system comprises a processor, a system memory and an interface for receiving removable system resources. These system resources and special features include expansion memory boards, parallel or serial input/output (I/O) ports, read only memory (ROM) or flash memory expansion boards, computer network interface cards, modem cards, smart cards, or other removable system resources or special feature mechanisms (generally denoted feature cards or cards).

A feature card includes a card memory area. The card memory area includes software for controlling the remaining card specific functionality. The software within the card memory area, including both data and processing logic, includes a device driver for controlling the feature card. The feature card device driver is separated into two parts: 1) a full device driver portion, and 2) a stub device driver portion. The full device driver provides all of the device driver functionality necessary to control each and every function of the feature card. The device driver stub is a small compact portion of processing logic associated with the full device driver, but mainly responsible for linking the full device driver with operating system software located in the computer system.

The card memory area comprises a device driver information block (DDIB) header, a device driver stub code image, and full device driver code. The device driver information block header comprises information used for linking the device driver with other device drivers and computer system processing logic. The device driver stub code image comprises a compact portion of processing logic and data that is copied into computer system memory upon insertion of a feature card into the computer system. The full device driver code remains card resident.

In the present invention, there is no upper bound for the size of a device driver stub of a given feature card. Furthermore, if a feature card has more than one type of functionality, then the feature card can have more than one device driver stub. Any system will have a known amount of card slots. To further reduce the amount of system memory required, cards in different slots can share device driver stub code if the cards have common functionality.

Upon insertion of a card into a slot of the computer system, the device driver stub code image is read from the card memory area and transferred into an area of computer system memory reserved for the device driver stubs. The device driver stub code is then executed by the processor of the computer system from computer system random access memory. Conversely, the full device driver code is not transferred to the computer system random access memory; rather, the full device driver is executed while still resident on the card. Upon execution, the device driver stub enables access to the full card resident device driver and allows memory mapping to the full device driver. The full device driver may then be activated by the processor.

The DDIB header comprises a set of information for linking the card device driver in a linked list with other device drivers and with the operating system logic executing within the computer system. By traversing the linked list, a particular device driver may be located by the operating system. Upon insertion of a card into a particular slot, the device driver loader linked list of device drivers is traversed to determine whether the device driver stub already resides in the area of the computer system memory reserved for the device driver stubs. If so, the operation of copying the device driver stub into computer system memory is prevented from occurring. As a card is inserted, a card insertion flag is set to indicate that the removable system resource is coupled to the computer system.

When a card is removed from the computer system, the linked list of device driver stubs is traversed to find all device driver stubs associated with the removed card. Each associated device driver stub is executed. The device driver stub disables access to the removed card by disallowing memory mapping to the removed card. The card insertion flag is reset to indicate that the removable system resource has been decoupled from the computer system.

In order to avoid the problems encountered in the prior art, the present invention exploits the fact that a typical system has more removable feature cards than feature card slots. In this paradigm, feature cards are swapped in and out of the system as needed. Thus, when every slot is occupied by a feature card, and a different feature card is needed, a feature card which is no longer needed is removed to permit the needed feature card to be added to the system.

In the present invention, a fixed amount of system memory RAM is set aside at bootstrap initialization to contain the device driver stubs. Device driver stubs corresponding to removed cards remain resident in system memory until a device driver stub cannot be loaded because the system memory set aside for device driver stubs has been filled. At that time, enough of the system memory set aside for device driver stubs is reclaimed to permit the desired device driver stub to be loaded.

System memory is reclaimed in two ways. First, if a card has been removed which has a device driver stub at least as large as the device driver stub to be loaded, then the device driver stub to be loaded is copied into the system memory in the gap occupied by the device driver stub of the removed card.

Secondly, if a device driver stub to be loaded will not fit within a single device driver stub gap formed by a removed card device driver stub, more than one removed card device driver stub gap can be combined to reclaim enough memory to load the device driver stub which is to be loaded. If the gaps to be combined do not reside contiguously within system memory, then they are combined by relocating within the part of system memory set aside for device driver stubs any intervening device driver stubs corresponding to cards which remain inserted in a slot.

Therefore, by allocating enough space in computer system memory to contain every device driver stub required by the system at a given time, and by reclaiming system memory occupied by removed card device driver stubs as the system memory is needed, one can avoid having to periodically reset the system by performing a bootstrap initialization procedure.

BRIEF DESCRIPTION OF THE DRAWINGS

The objects, features, and advantages of the method and apparatus of the present invention will be apparent from the following detailed description of the invention in which:

FIG. 6c illustrates the content of a stub header. FIG. 6d illustrates the content of the stub data area.

DETAILED DESCRIPTION OF THE INVENTION

The present invention is a computer system having a method and circuitry for dynamically configuring device drivers of removable system resources. In the following description, numerous specific details are set forth in order to provide a thorough understanding of the present invention. However, it will be apparent to one of ordinary skill in the art that these specific details need not be used to practice the present invention. In other circumstances, well known structures, circuits, and interfaces have not been shown in detail in order not to obscure unnecessarily the present invention.

Figure 1:
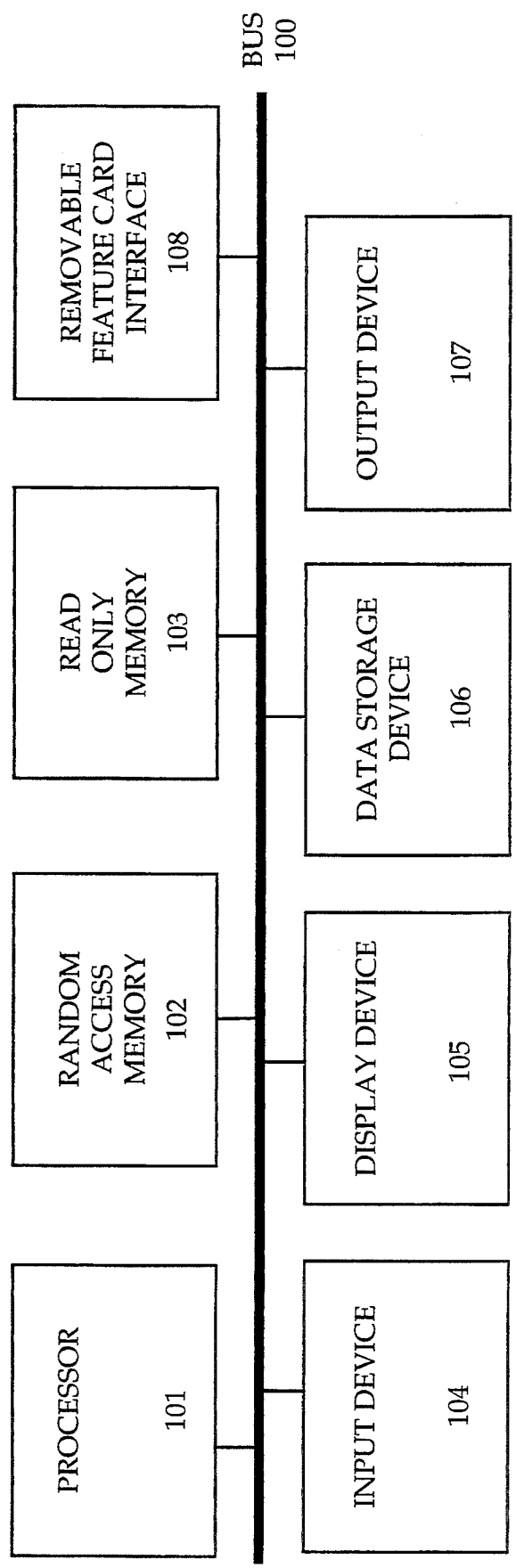
FIG. 1 is a block diagram of the architecture of a computer system in which the present invention operates.

Referring now to FIG. 1, a block diagram of the computer system in which the present invention operates is illustrated. It will be apparent to those of ordinary skill in the art, however, that alternative computer system architectures may be employed. In general, such computer systems as illustrated by FIG. 1 comprise a bus 100 for communicating information, a processor 101 coupled with the bus 100 for processing information, and a random access memory device 102 coupled with the bus 100 for storing information and instructions for processor 101. The processing logic of the present invention is typically stored in a device such as random access memory 102 and executed therefrom by processor 101. In addition, a typical computer system may optionally include other system resources including a read only memory device 103 coupled with the bus 100, an input device 104 such as an alphanumeric input device or a cursor control device coupled to the bus 100 for communicating information and command selections to the processor 101, a display device 105 such as a video display terminal or a liquid crystal display device coupled to the bus 100 for displaying information to a computer user, a data storage device 106 such as a magnetic disk and disk drive coupled with the bus 100 for storing information and instructions, an output device 107 such as a printer or facsimile apparatus coupled to the bus 100 for communicating information to a destination external to the computer system, and a removable electronic feature card interface 108 for electrically removably coupling an electronic circuit card to bus 100.

Removable feature cards which may be removably inserted into interface 108 generally comprise electronic microcircuits within a thin housing including a detachable multiple connector interface with which the feature card may be removably inserted into a slot in a computer system housing. In one embodiment, the feature cards and feature card interface 108 used with the present invention adhere to the PCMCIA release 2.0 standard for electronic feature cards. Feature cards of this form are well known to those of ordinary skill in the art.

Figure 2:
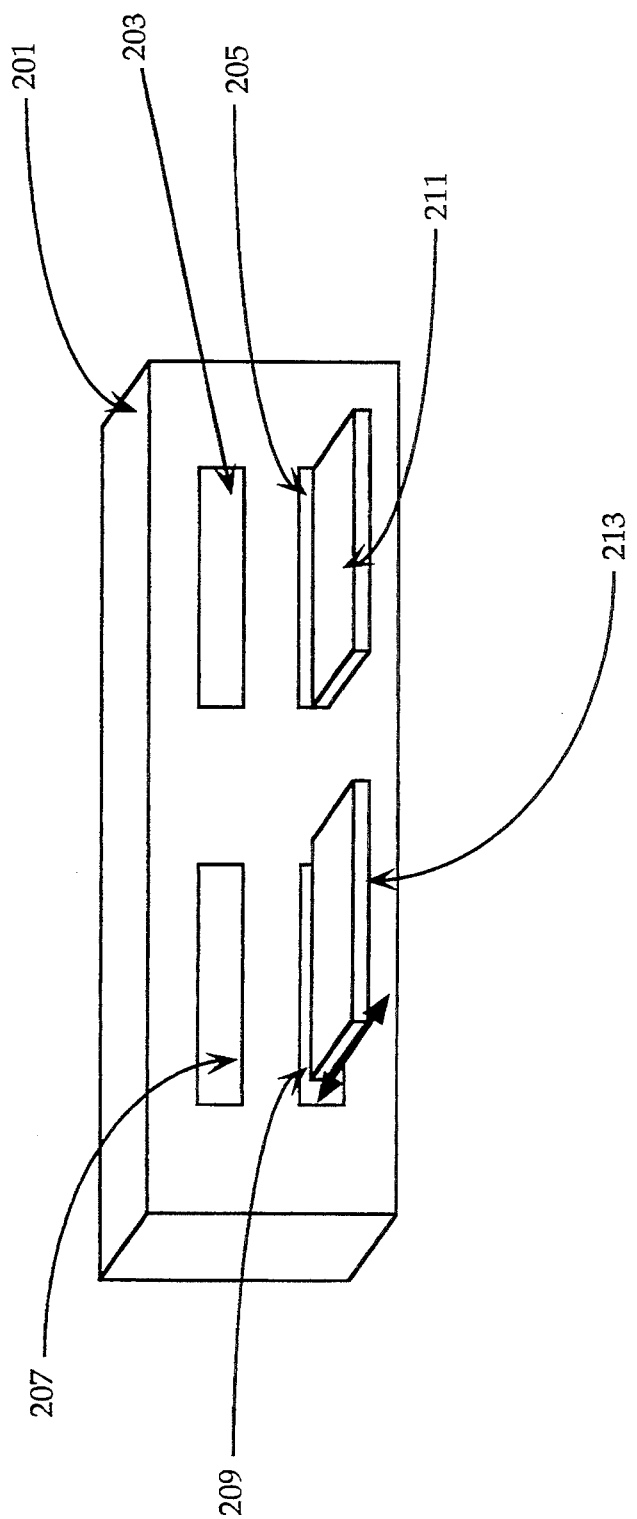
FIG. 2 is an example of a computer housing containing a plurality of feature card insertion slots.

Referring now to FIG. 2, an illustration of a computer system housing having a plurality of feature card interfaces (203, 205, 207, and 209) is illustrated. As shown, feature cards 211 and 213 may be removably inserted and thereby electrically coupled to an interface 108 within the computer system. This feature card structure facilitates the convenient insertion and/or removal of feature cards during the course of a computing session.

Figure 3:
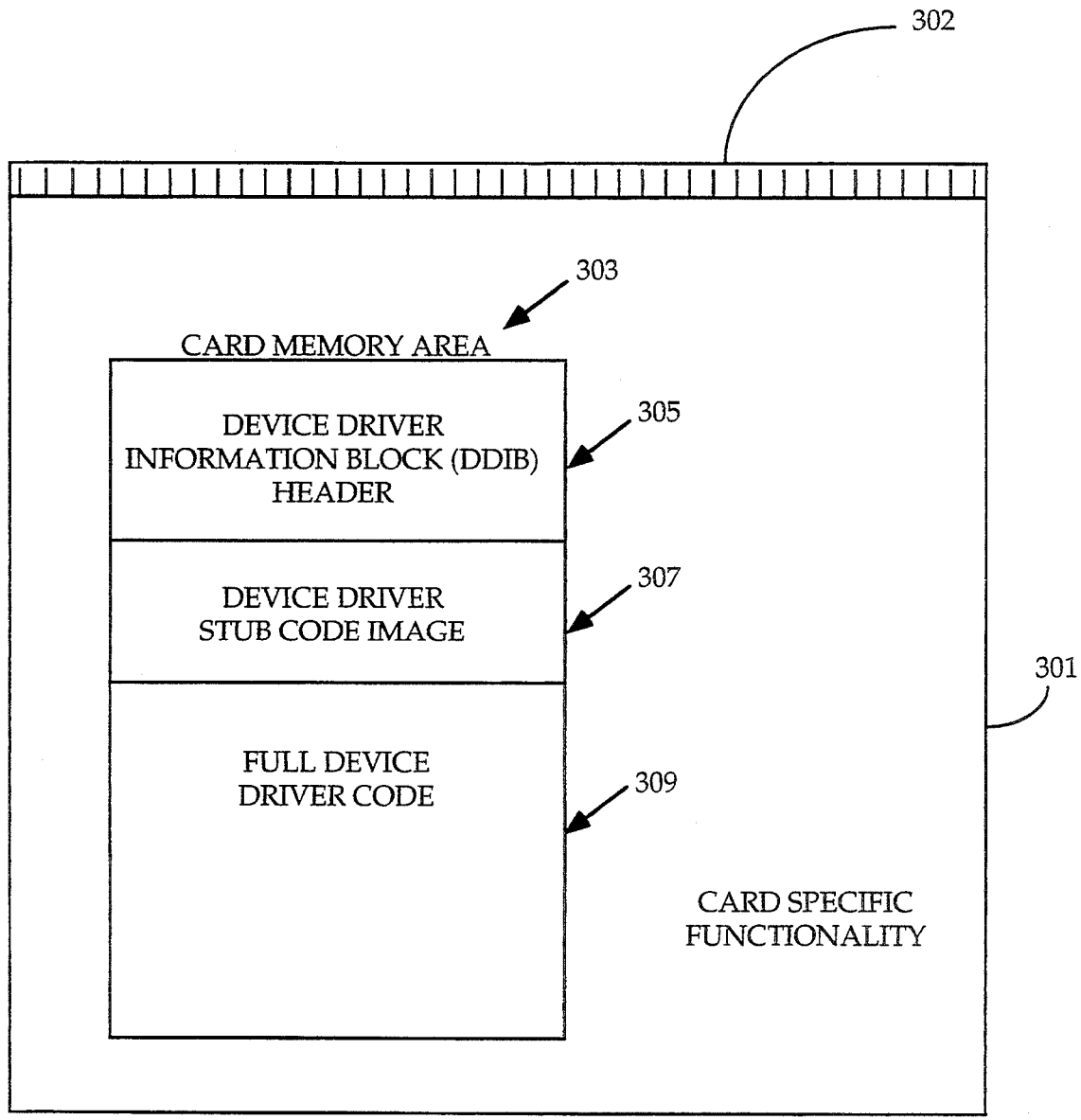
FIG. 3 is a block diagram of the contents of a removable electronic feature card.

Referring now to FIG. 3, the structure of a typical feature card 301 is illustrated. Feature card 301 includes an interface 302 with which the feature card 301 may be removably electrically coupled to a computer system. Feature card 301 also includes a card memory area 303. Card memory area 303 includes software for controlling the remaining card specific functionality. The software within card memory area 303, including both data and processing logic, includes a device driver for controlling the operation of the feature card.

As described above, it is convenient to store the device driver for a feature card on the feature card itself. Using this technique, RAM space within the computer system does not need to be provided for the card device driver and processing time is not consumed in transferring a device driver from the card to computer system RAM. Maintaining the card device driver on the card itself also achieves the advantage of assuring that the device driver is always compatible with the card specific functionality. There is less chance for a mismatch between the device driver stored in the computer system and the card specific functionality provided on the card.

In order to avoid the problems encountered in the prior art, the feature card device driver of the present invention is separated into two parts: 1) a full device driver portion, and 2) a stub device driver portion. The full device driver provides all of the device driver functionality necessary to control each and every function of the feature card. The device driver stub is a small compact portion of processing logic associated with the full device driver but mainly responsible for linking the card resident full device driver to operating system software located in the computer system. The device driver stub is copied into and executed from computer system random access memory. Conversely, the full device driver remains resident on the feature card and is executed therefrom. Because the device driver stub for each feature card is a compact processing logic block, many such device driver stubs for different feature cards may be stored in computer system random access memory without consuming excessive amounts of computer system RAM. This configuration allows a large number of device driver stubs to be resident in computer system memory without having to allocate computer system RAM for the full device driver for each feature card.

Furthermore, the present invention exploits the fact that a typical system has more removable feature cards than feature card slots. In this paradigm, feature cards are swapped in and out of the system as needed. Thus, when every slot is occupied by a feature card, and a different feature card is needed, a feature card which is no longer needed is removed to permit the needed feature card to be added to the system.

In the present invention, a fixed amount of system memory RAM is set aside at bootstrap initialization to contain the device driver stubs. Device driver stubs corresponding to removed cards remain resident in system memory until a device driver stub cannot be loaded because the system memory set aside for device driver stubs has been filled. At that time, enough of the system memory set aside for device driver stubs is reclaimed to permit the desired device driver stub to be loaded.

System memory is reclaimed in two ways. First, if a card has been removed which has a device driver stub at least as large as the device driver stub to be loaded, then the device driver stub to be loaded is copied into the system memory in the gap occupied by the device driver stub of the removed card.

Secondly, if a device driver stub to be loaded will not fit within a single device driver stub gap formed by a removed card device driver stub, more than one removed card device driver stub gap can be combined to reclaim enough memory to load the device driver stub which is to be loaded. If the gaps to be combined do not reside contiguously within system memory, then they are combined by relocating within the part of system memory set aside for device driver stubs any intervening device driver stubs corresponding to cards which remain inserted in a slot.

Therefore, by allocating enough space in computer system memory to contain every device driver stub required by the system at a given time, and by reclaiming system memory occupied by removed card device driver stubs as the system memory is needed, one can avoid having to periodically reset the system by performing a bootstrap initialization procedure.

Figure 4:
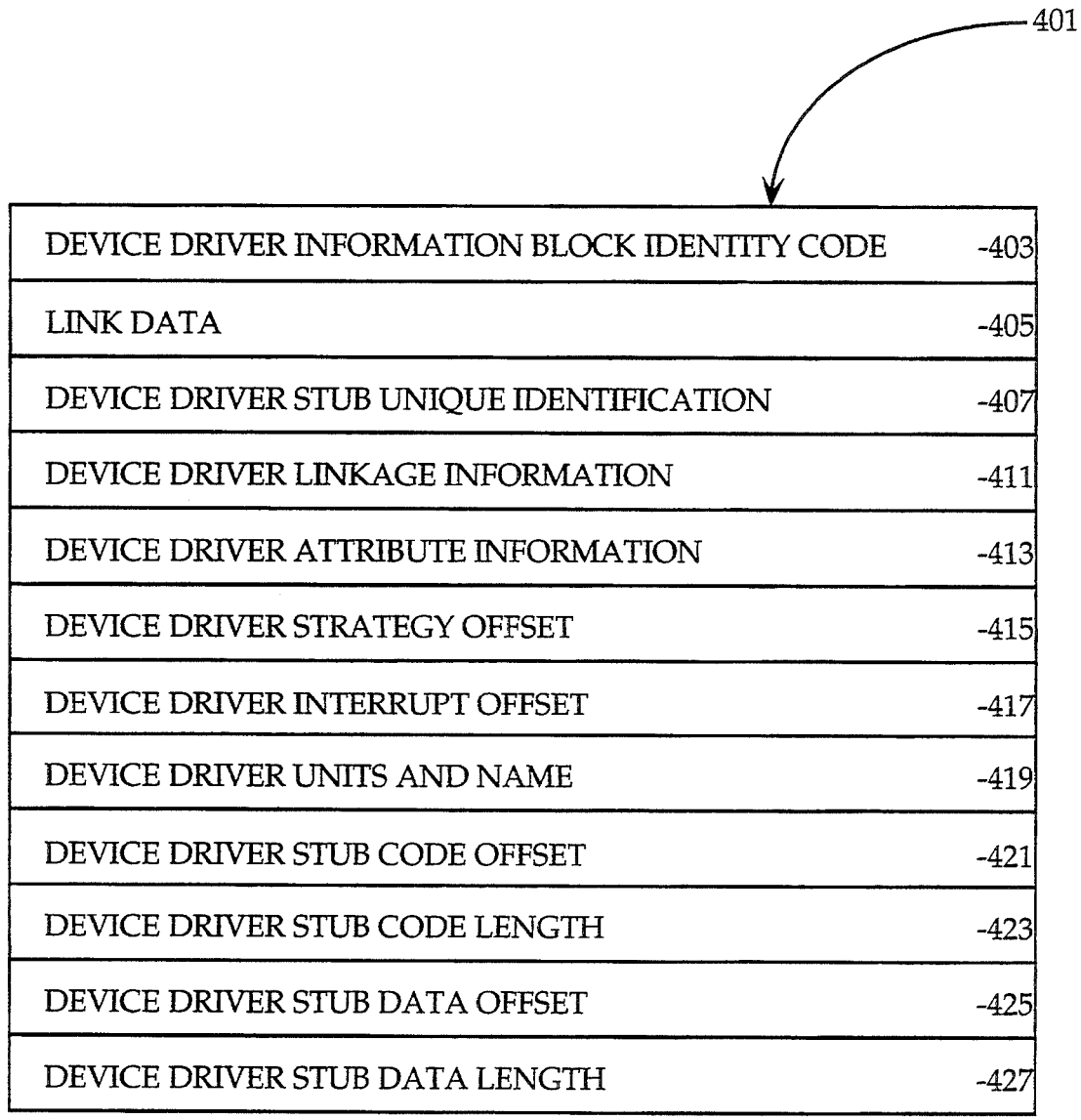
FIG. 4 illustrates the content of the Device Driver Information Block Header.

Referring again to FIG. 3, card memory area 303 comprises device driver information block (DDIB) header 305, device driver stub code image 307, and full device driver code 309. Device driver information block header 305, comprises information used for linking the device driver with computer system processing logic. The content and structure of device driver information block header 305 is illustrated in FIG. 4 and described below. Card memory area 303 also comprises the device driver stub code image 307 which is copied to computer system memory and the full device driver code 309 which remains card resident.

Upon insertion of card 301 into a slot of the computer system, the device driver stub code image 307 is read from card memory area 303 and transferred into an area of computer system memory 102 set aside for device driver stubs. The device driver stub code is then executed by the processor of the computer system from computer system random access memory. Conversely, full device driver code 309 is not transferred to the computer system random access memory; rather the full device driver is executed while still resident on card 301. Upon execution, the device driver stub enables access to the full card resident device driver 309 and allows memory mapping to the full device driver 309. The full device driver 309 may then be activated by the processor 101.

Referring now to FIG. 4, the content and structure of the device driver information block (DDIB) header is illustrated. DDIB header comprises a set of information for linking the card device driver with operating system logic executing within the computer system.

DDIB header comprises a device driver information block identity code 403 that identifies the remaining information as being part of a DDIB header. Link data field 405 is used for linking the DDIB with other DDIBs (not shown) in the card memory area 303. Device driver stub unique identification 407 is a unique value that identifies the device driver stub and distinguishes the device driver stub from all other device driver stubs. Device driver stub data size 409 specifies the size of a RAM data area required by this device driver stub.

The next five DDIB header fields (i.e. fields 411, 413, 415, 417, and 419) are all the same values contained within a standard operating system device driver header. Specifically, these five parameters are contained within the DOS (Disk Operating System developed by Microsoft, Corp., Redmond, Wash.) device driver header which is well known to those of ordinary skill in the art. Device driver linkage information 411, device driver attribute information 413, and device driver units and name 419 comprise device driver identification and linkage information used by the operating system to identify and link with the corresponding device driver. The device driver strategy offset 415 and device driver interrupt offset 417 contain the offset from the beginning of the device driver stub code area. These fields are modified by the operation of the present invention as will be described below. Device driver stub code offset 421 and device driver stub code length 423 provide a means by which the computer system processing logic may determine the location and size of the device driver stub code segment resident on the feature card. Similarly, device driver stub data offset 425 and device driver stub data length 427 provide a means for determining the location on the feature card and the size of the device driver stub data area. Knowing the location and size of the code and data areas for the device driver stub, operating system logic within the computer system can transfer the device driver stub code and data areas from the feature card into computer system random access memory.

Figure 5:
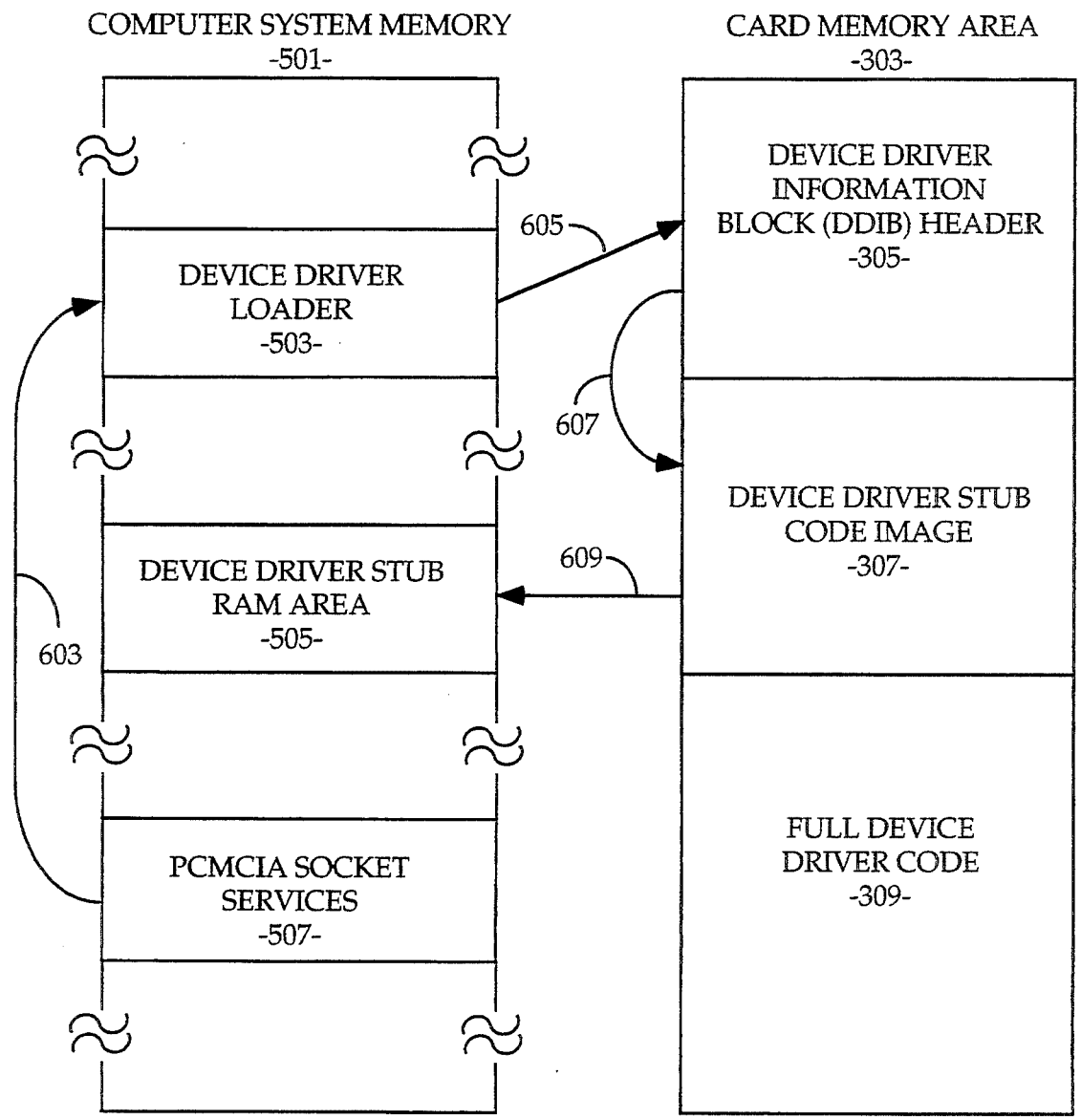
FIG. 5 illustrates the content of computer system memory as related to the content of the feature card memory.

Referring now to FIG. 5, a portion of computer system memory 501 residing within random access memory 102 is illustrated. Computer system memory portion 501 comprises device driver loader 503, device driver stub RAM area 505, and PCMCIA socket services 507. Device driver loader 503 comprises processing logic for loading and dispatching the appropriate device driver on initialization of the computer system and when a card is inserted or removed (i.e. a card insertion or removal event) from the computer system. The details of the processing performed by the device driver loader 503 of one embodiment is described in more detail in connection with the flow charts of FIGS. 7 and 8. Device driver stub RAM area 505 comprises a memory area used for the storage of device driver stubs that are either loaded during computer system initialization time or loaded upon the insertion of a card into the computer system. The content of device driver stub RAM area 505 is described in more detail in connection with FIGS. 6a and 6b. PCMCIA socket services 507 comprises processing logic for handling low level control of card insertion and removal events. Processing logic within PCMCIA socket services 507 receives interrupts upon the detection of a card insertion or removal event. Processing logic corresponding to the function carried out by PCMCIA socket services 507 is well known to those of ordinary skill in the art.

Also illustrated in FIG. 5 is card memory area 303 as described above in connection with FIG. 3. Card memory area 303 comprises device driver information block (DDIB) header 305, device driver stub code image 307, and full device driver code 309.

Upon a card insertion event, PCMCIA socket services 507 receives an interrupt and initially responds to the card event. PCMCIA socket services 507 activates device driver loader 503 as indicated by line 603 in FIG. 5. Upon activation of device driver loader 503, PCMCIA socket services 507 provides device driver loader 503 with an identification of the socket adapter and socket for which the card event interrupt was received. Device driver loader 503 then accesses the device driver information block (DDIB) header 305 on the newly inserted card as indicated by line 605. By accessing DDIB header 305, device driver loader 503 gains access to the card information described above in connection with FIG. 4. Specifically, device driver loader 503 reads the device driver stub unique identification 407, device driver stub code offset 421, device driver stub code length 423, device driver stub data offset 425, and device driver stub data length 427. Using this information, device driver loader 503 determines where in card memory area 303 the device driver stub code image 307 resides. Once the location and size of device driver stub code image 307 is determined as indicated by line 607, device driver loader 503 copies the contents of device driver stub code image 307 from card memory area 303 into a portion of device driver stub RAM area 505 as indicated by line 609 in FIG. 5. The device driver stub code image 307 is linked into a linked list of device driver stubs maintained by device driver loader 503. The manner in which the device driver stubs are linked by device driver loader 503 is described in connection with FIGS. 6a and 6b.

Figure 6A:
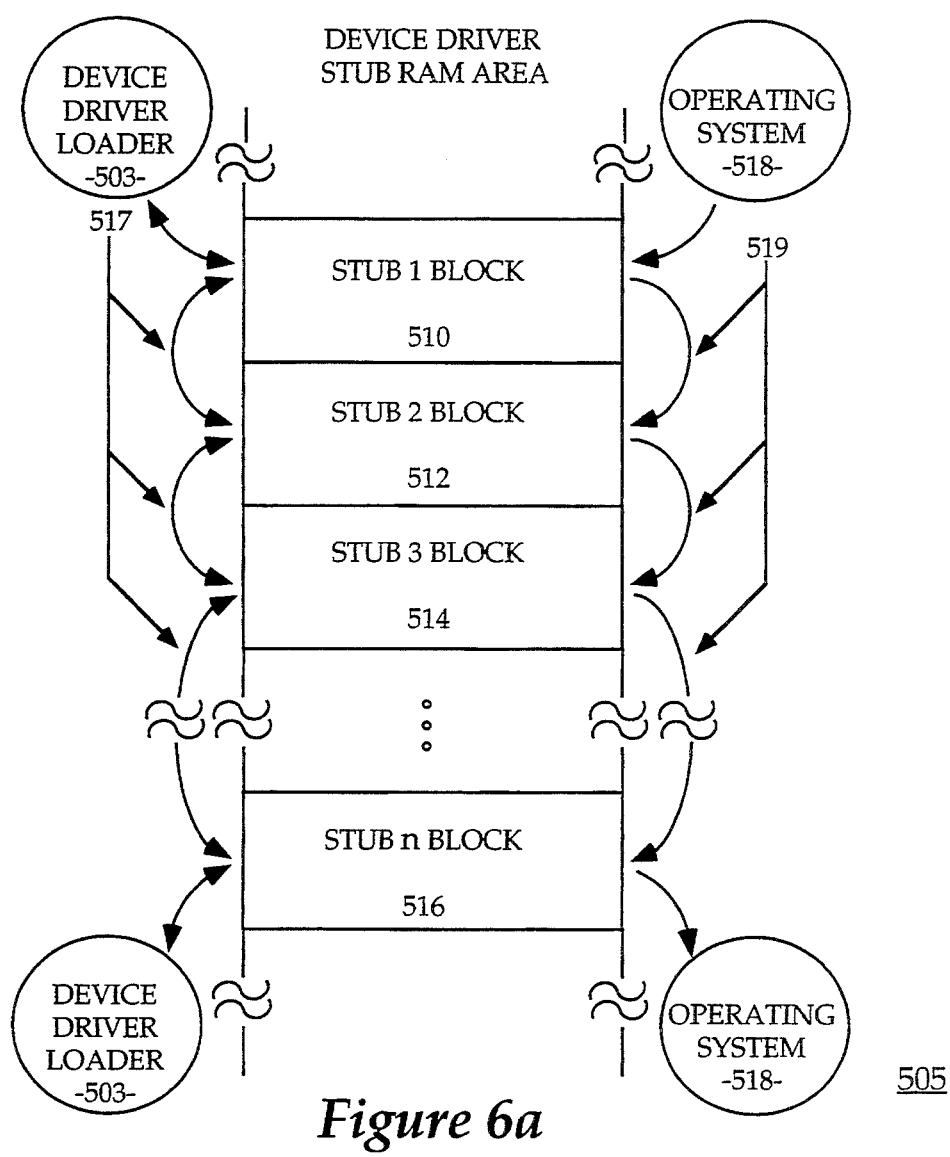
FIG. 6a illustrates the content of the Device Driver Stub RAM Area.

Referring now to FIG. 6a, the device driver stub RAM area 505 is illustrated. Device driver stub RAM area 505 comprises memory storage area for a plurality of device driver stub blocks. By way of example, FIG. 6a illustrates stub 1 block 510, stub 2 block 512, stub 3 block 514, and stub n block 516. It will be apparent to those skilled in the art that any number of device driver stub blocks from 0 to n may reside within device driver stub RAM area 505. It will be also apparent to those skilled in the art that the number of stub blocks within device driver stub RAM area 505 dynamically changes throughout the usage of the computer system as cards are added and removed. Thus, the device driver stubs do not need to be fixed in memory at bootstrap initialization time. It should also be noted that the relative size or number of memory locations required by each device driver stub block is relatively small in comparison to the full device driver code which controls feature card functionality. The relatively small size of each device driver stub block provides the opportunity to store a large number of different device driver stubs within device driver stub RAM area 505.

Figure 6B:
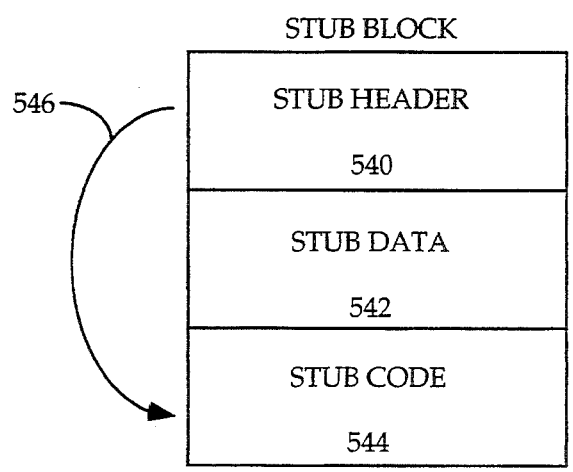
FIG. 6b illustrates the content of a stub block.

The device driver stub blocks within device driver stub RAM area 505 are each composed of three components. Referring now to FIG. 6b, the three components of each stub block of device driver stub RAM area 505 are illustrated. Each stub block comprises a stub header 540, stub data 542, and stub code 544. Stub header 540 is used mainly by operating system logic that controls the operation of the computer system.

Referring now to FIG. 6c, the content of stub header 540 is illustrated. Stub header 540 comprises device driver linkage information 630, device driver attribute information 632, device driver strategy offset 634, device driver interrupt offset 636, and device driver units and name 638. The computer system memory 102 resident device driver information 630, 632, 634, 636, and 638 of the stub header 540 corresponds to the device driver information 411, 413, 415, 417, and 419 of the card resident DDIB header. The DDIB device driver information is transferred to the stub header 540 when a stub device driver is loaded.

Device driver linkage information 630, device driver attribute information 632, and device driver units and name 638 comprise device driver identification and linking information used by the operating system to identify and link with the corresponding device driver. Device driver linkage information 630 is used by the operating system to create a forward linked list of device drivers as illustrated by lines 519 in FIG. 6a. Using the device driver linkage information 630, the operating system 518 may access each device driver in the linked list by traversing down the list using the device driver linkage information of each device driver stub block until the last device driver stub block points back to the operating system 518. Stub header 540 also includes a device driver strategy offset 634 and a device driver interrupt offset 636 which are used to identify the entry point to stub code 544 as illustrated by line 546 in FIG. 6b.

Referring now to FIG. 6d, the content of stub data 542 is illustrated. Stub data 542 comprises pointers 660 and 662 that are used by device driver loader 503 for creating a forward and backward linked list of device driver stub blocks within device driver stub RAM area 505. Pointer 660 is a pointer to the previous device driver stub block in the linked list. Pointer 662 is a pointer to the next device driver stub block in the linked list. This doubly linked list structure is illustrated in FIG. 6a by lines 517.

Referring to FIG. 6a, device driver loader 503 contains a pointer to the first device driver stub block 510 in the linked list. The pointer 662 of stub 1 block 510 points to stub 2 block 512. Similarly, pointer 660 of stub 1 block 510 points back to device driver loader 503. In a similar manner, pointers 660 and 662 of each device driver stub block is used to point to the previous and next device driver stub in the linked list. Thus, the device driver stubs are forward and backward linked in a linked list. The last device driver stub block in the linked list (i.e., stub n block 516), points back to device driver loader 503 to complete the doubly linked list.

Referring again to FIG. 6d, stub data 542 also comprises an adapter identification 664 and a socket identification 666. Adapter identification 664 and socket identification 666 uniquely identify the computer system hardware interface with which the device driver stub is associated. Device driver stub unique identification 668, which is the same identification as the feature card resident device driver stub unique identification 407 illustrated in FIG. 4, uniquely identifies the device driver stub associated with the feature card. Card insertion flag 672 is used to retain an indication of whether the card associated with the device driver stub is inserted or removed. Driver specific data area 674 is a memory area allocated for use by the device driver stub for storage of its own data. The fields data area size 676 and code area size 678 contain the respective information copied from the DDIB of FIG. 4.

Referring again to FIG. 6d, the command field 680 contains one of the four possible commands used by the device driver loader to instruct the device driver stub to perform the requested function. The first command is "initialize" and is used when the device driver stub is first copied into the device driver stub RAM area 505. The second command is "unlink" and is used when the device driver stub is to be unlinked from the operating system. The third command is "prepare for move" and is used when the device driver stub is to be moved within the device driver stub RAM area 505 to reclaim a portion of device driver stub area 505 large enough to accommodate a new device driver stub. The fourth, and final, command is "move completed" and is used when the device driver stub has been successfully moved within the device driver stub RAM area 505.

Referring now to FIGS. 7-16b, flowcharts of the processing logic used by one embodiment of the present invention are illustrated. It will be apparent to those skilled in the art that the processing logic described herein may be executed by processor 101 of the computer system.

Figure 7:
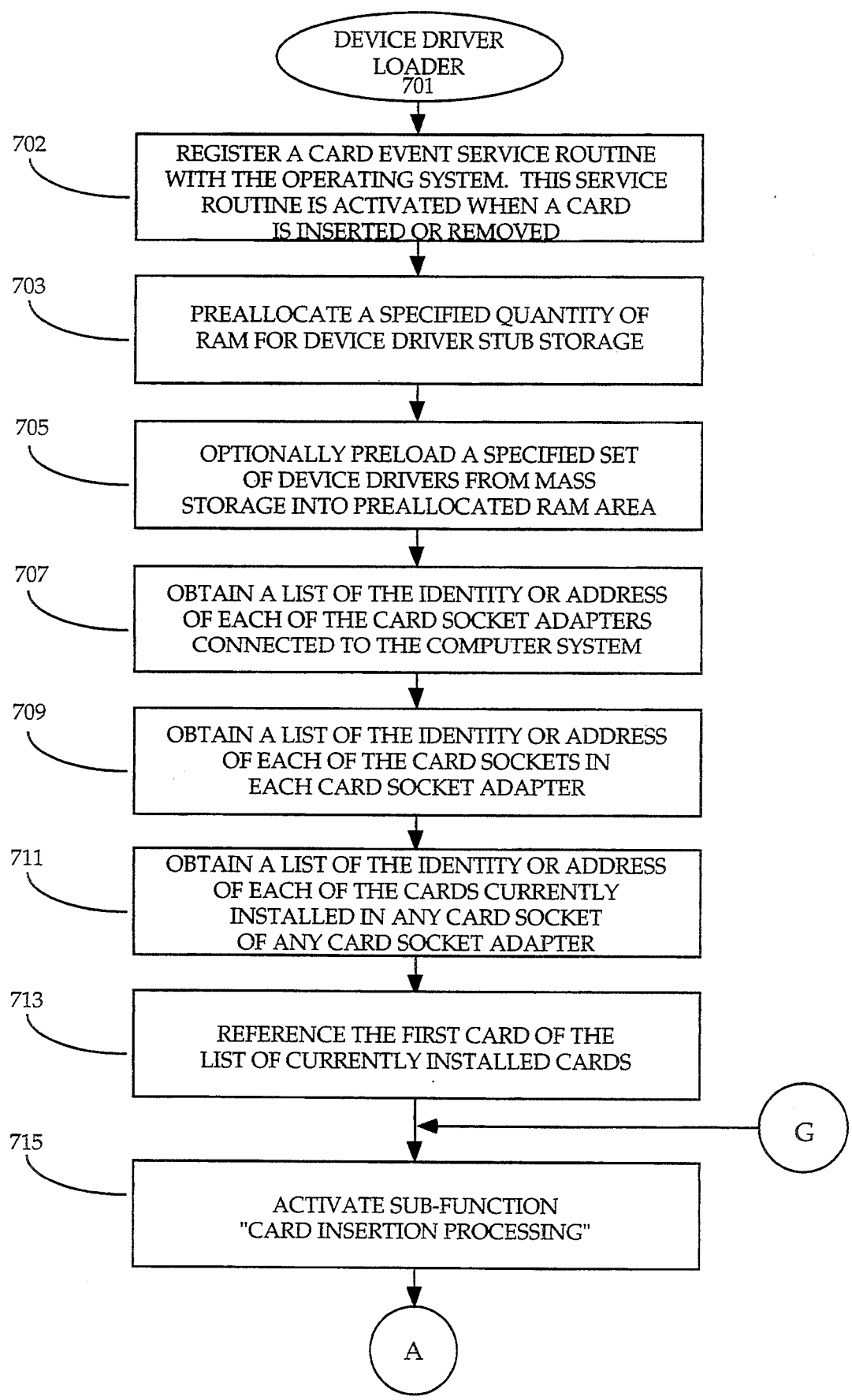
FIG. 7–16b are flow charts illustrating the processing logic of one embodiment of the present invention.

Referring now to FIG. 7, the processing logic associated with the device driver loader 701 is illustrated. Device driver loader logic 701 corresponds to device driver loader 503 illustrated in FIGS. 5 and 6a. Processing logic starting at bubble 701 may be activated by the operating system at bootstrap initialization of the computer system. In one embodiment of the present invention, parameters of the device driver loader would include the size of system memory to be set aside for containing device driver stub blocks.

Upon activation of the device driver loader, a card event service routine is registered with the operating system in processing block 702. Means for registering a service routine with the operating system is well-known in the art. This card event service routine is activated upon a card insertion or removal event.

Device driver stub RAM area 505 is allocated in processing block 703. A predetermined quantity of random access memory 102 is allocated for the storage of device driver stubs in device driver stub RAM area 505. A set of commonly used device drivers may optionally be preloaded into the device driver stub RAM area 505 during initialization time in processing block 705. These initially loaded device drivers may be stored on a mass storage device and transferred from there into device driver stub RAM area 505.

Next, in processing block 707, the hardware interfaces are queried to determine the identity and address of card socket adapters that are connected and available for use within the computer system. In an alternate embodiment, this information may be provided as parameters and obtained by the device driver loader in processing block 707.

In a similar manner, the address or identity of each of the card sockets within each card socket adapter is determined in processing block 709. If any feature cards are currently installed in any of the available sockets of the computer system, the identity or address of the installed cards is obtained in processing block 711. The device driver loader now has a list of card socket adapters, a list of card sockets, and a list of currently installed feature cards. An index parameter is initialized to point to the first of the currently installed cards in the list of installed cards in processing block 713. A subfunction called "Card Insertion Processing" is then activated in processing block 715 to install the device driver stub for the currently indexed card. Device driver loader processing continues at the bubble labeled A as illustrated in FIG. 8.

Figure 8:
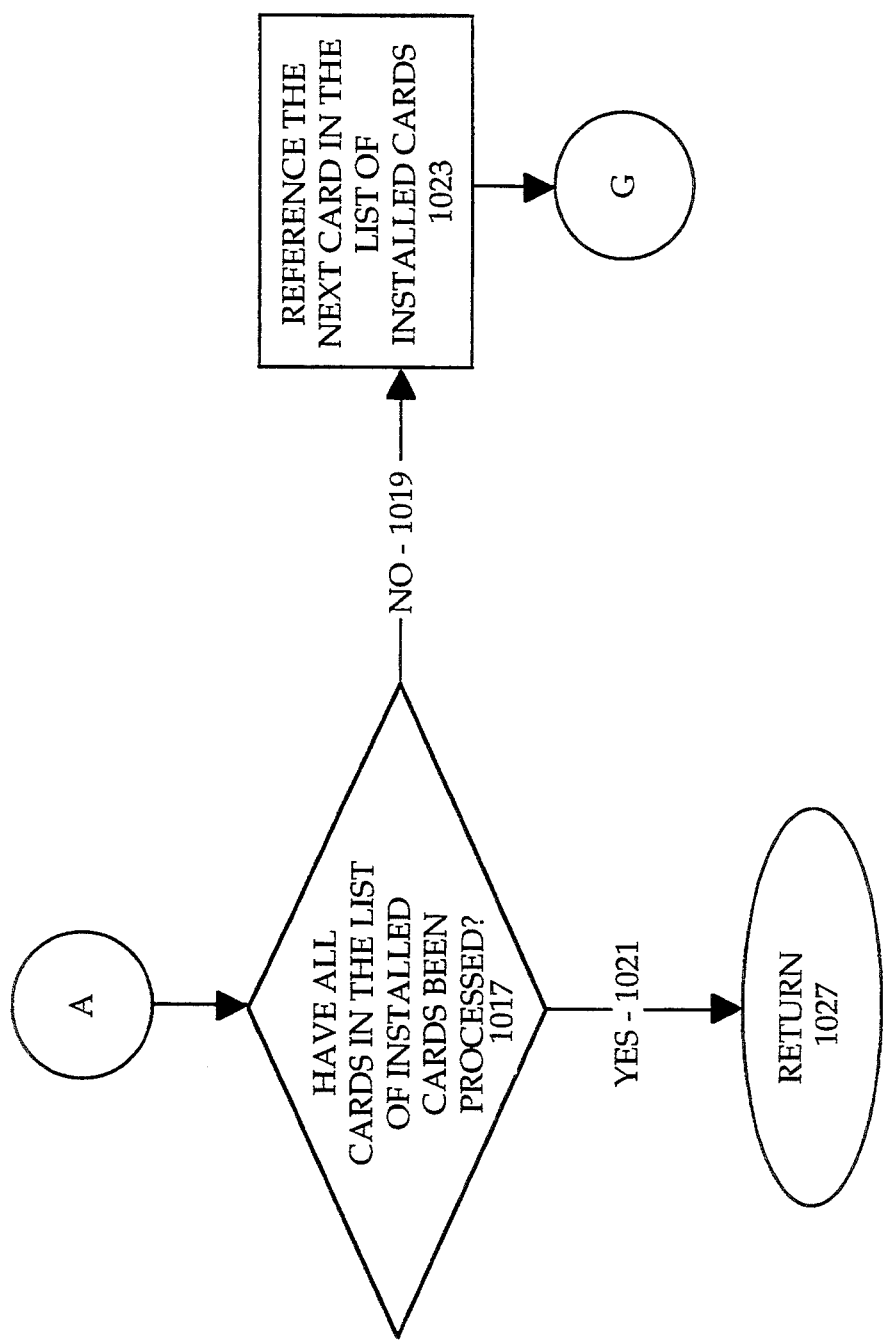

Referring now to FIG. 8, the processing for the device driver loader continues at the bubble labeled A. As the list of currently installed cards is processed, decision block 1017 is executed to determine if all cards have been processed. Once all of the cards in the list of installed cards have been processed, processing path 1021 is taken to termination bubble 1027 where processing for the device driver loader terminates. If each of the installed cards in the list of installed cards have not yet been processed, processing path 1019 is taken to processing block 1023 where the index into the list of installed cards is advanced to point to the next installed card and processing continues at the bubble labeled G as illustrated in FIG. 7. At the bubble labeled G, the card insertion processing subfunction is again activated for the newly indexed installed card.

Figure 9:
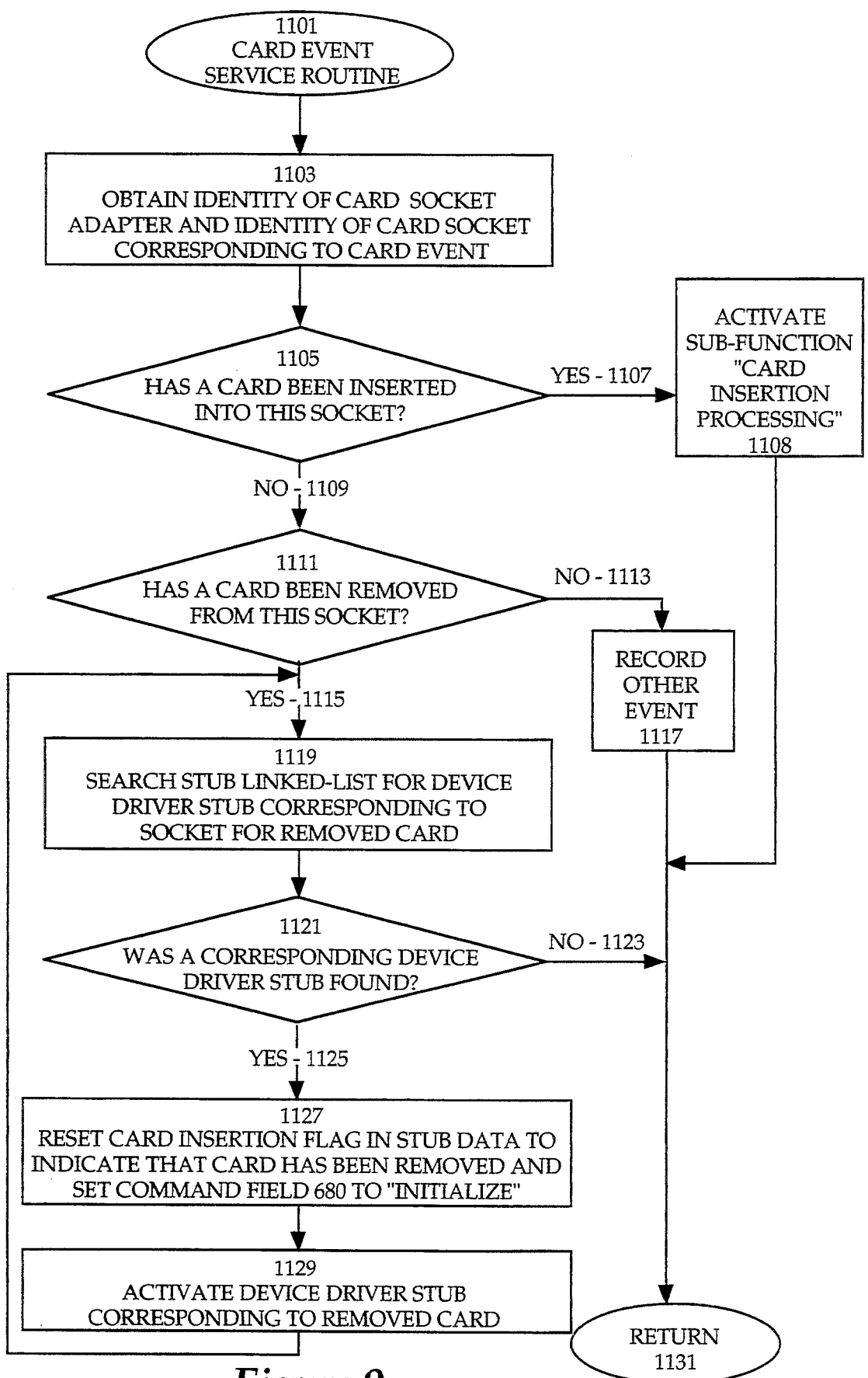

Referring now to FIG. 9, the processing for a card event service routine 1101 is illustrated. Card event service routine 1101 is a software routine registered with the operating system at bootstrap initialization of the computer system. Card event service routine 1101 is activated when a hardware event is detected by the computer system upon the insertion or removal of a feature card in any socket provided by the computer system. Upon activation of card event service routine 1101, the identity of the card socket adapter and the card socket corresponding to the hardware event is obtained in processing block 1103. If a card insertion event is detected, processing path 1107 is taken to processing block 1108 where the card insertion processing subfunction is activated for the newly installed card. Processing then terminates at return bubble 1131.

Referring again to decision block 1105, if a card has not been inserted into a socket, processing path 1109 is taken to decision block 1111. If a card removal event is detected, processing path 1115 is taken to processing block 1119 where the linked list of device driver stubs within device driver stub RAM area 505 is traversed in search of a device driver stub corresponding to the socket for the removed card. If the device driver stub corresponding to the removed card is found, processing path 1125 is taken to processing block 1127 where a card insertion flag in the stub data is reset to indicate that the corresponding card has been removed and command field 680 is set to "initialize".

Once the card insertion flag for the removed card has been reset, the device driver stub corresponding to the removed card is activated in processing block 1129. Activation of the device driver stub corresponding to the removed card causes the device driver stub to gracefully terminate any ongoing activity while the card was installed and disables further access to the removed card. The device driver stub is then unlinked from the linked list of device driver stubs. Upon completion of processing block 1129, control is transferred back to processing block 1119 where the stub linked list is again traversed for another device driver stub corresponding to the socket for which a card removal event was detected. The loop between processing blocks 1119 and 1129 continues for each device driver stub in the linked list until every device driver stub of the removed card is processed. When this occurs, processing path 1123 is taken to bubble 1131 where processing for card event servicing terminates.

Referring back to decision block 1111, if the hardware event causing the activation of card event service routine 1101, is neither a card insertion event nor a card removal event, processing path 1113 is taken to processing block 1117 where the unidentified event is recorded. Processing then terminates at bubble 1131.

Figure 10:
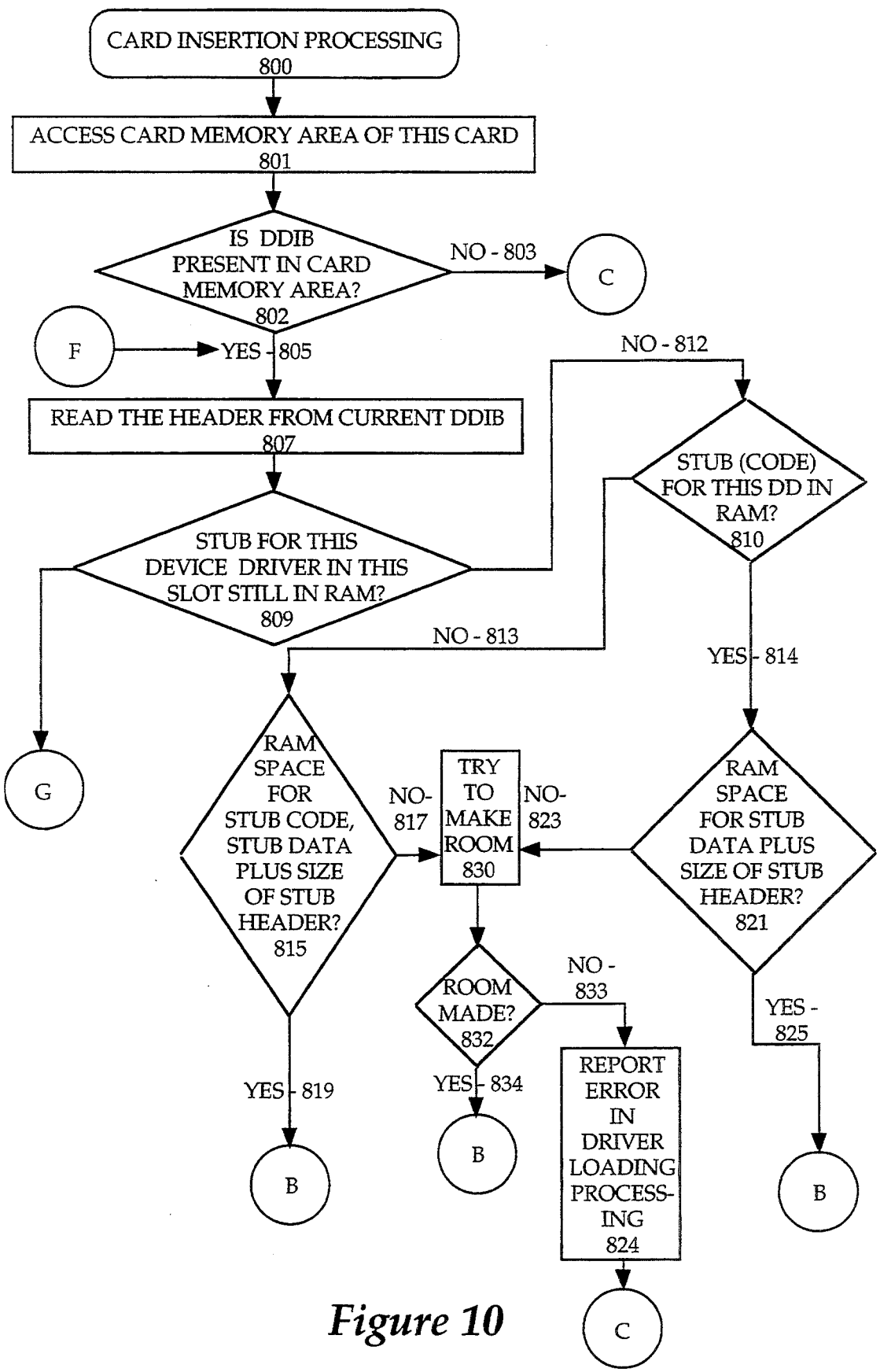

Referring now to FIG. 10, the card insertion processing subfunction 800 is illustrated. Card insertion processing 800 is activated either from processing block 715 illustrated in FIG. 7 or processing block 1108 illustrated in FIG. 9. Card insertion processing 800 is responsible for controlling the allocation and loading of a device driver stub corresponding to a newly inserted feature card. Starting at processing block 801, the card memory area of the newly inserted card is accessed. If a device driver information block (DDIB) is present in the card memory area of the newly installed card, processing path 805 is taken to processing block 807. If no DDIB is present in the card memory area, processing path 803 is taken to the bubble labeled C illustrated in FIG. 12 where card insertion processing terminates at bubble 1017. Because not all feature cards require a device driver, processing path 803 is provided for those cards that do not require a device driver.

Figure 11:
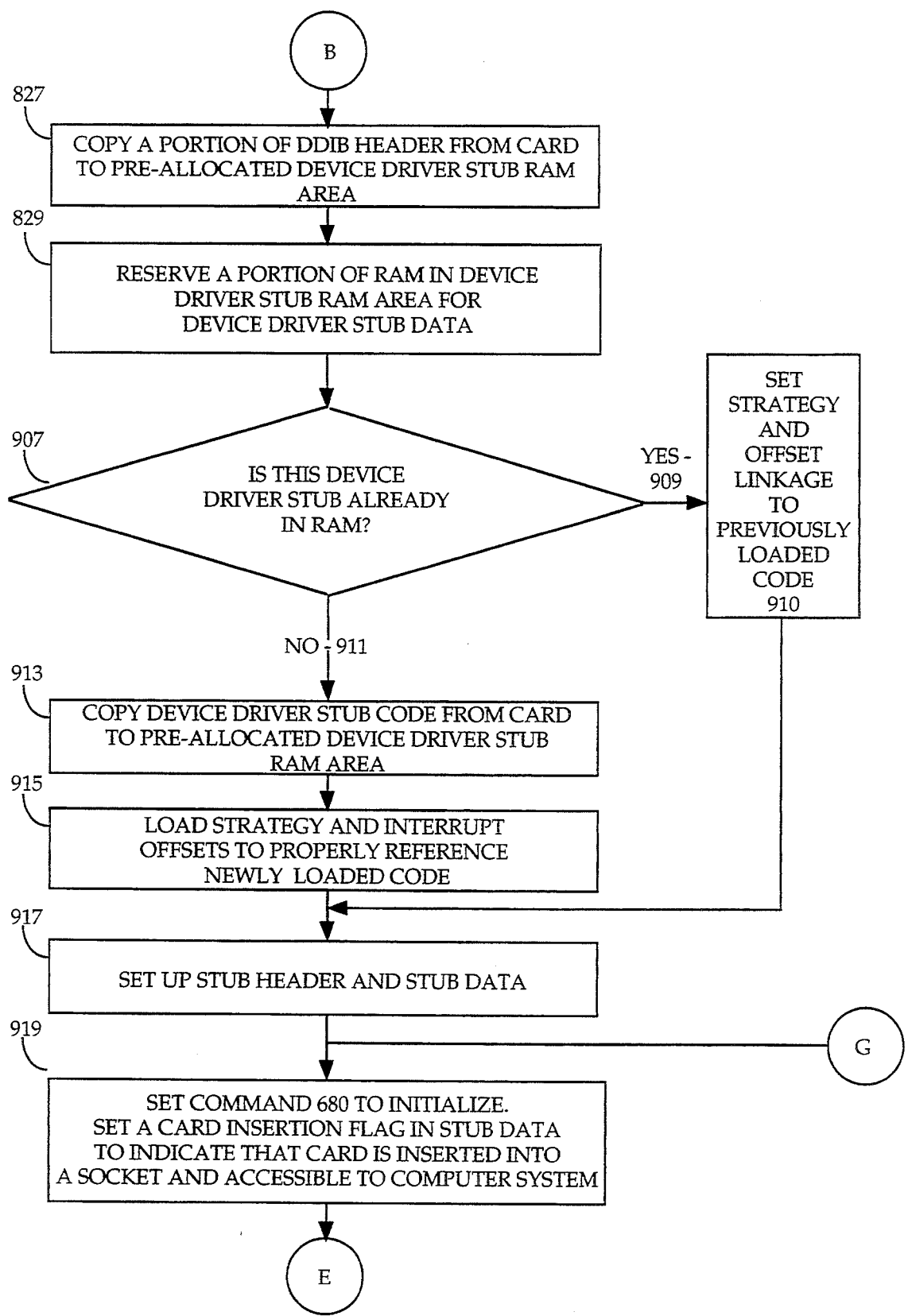
Figure 12:
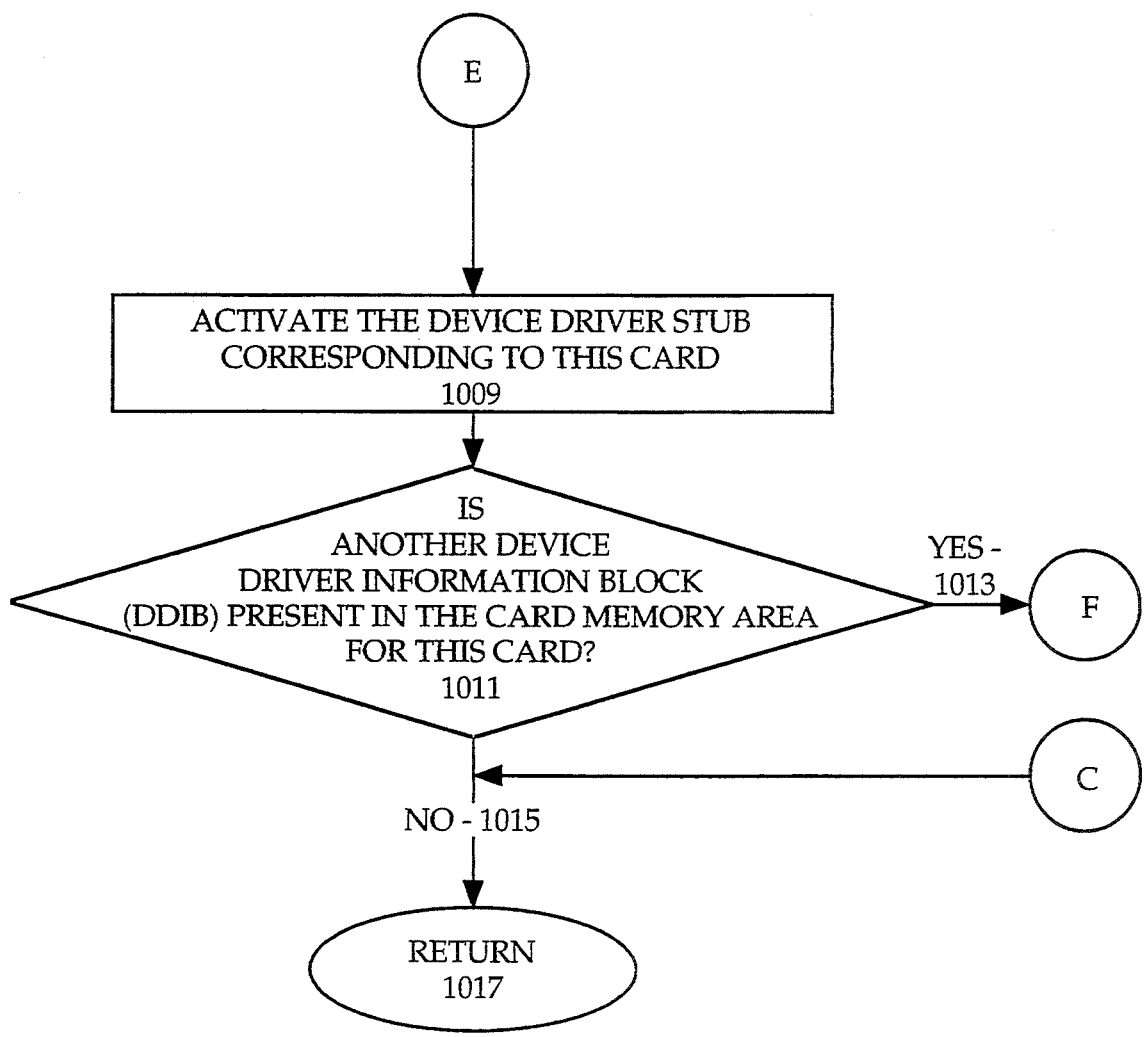
Figure 15A:
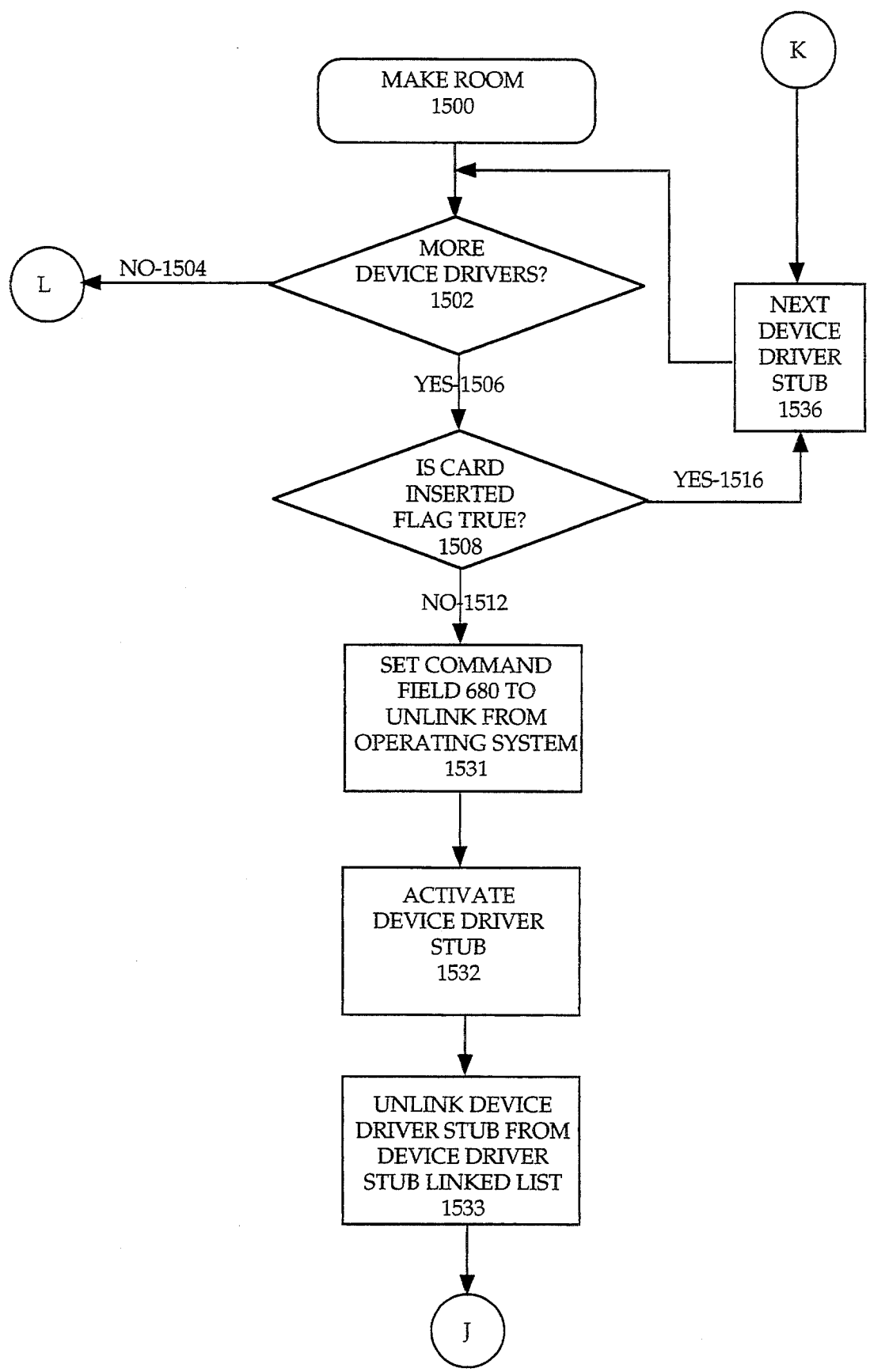
Figure 15B:
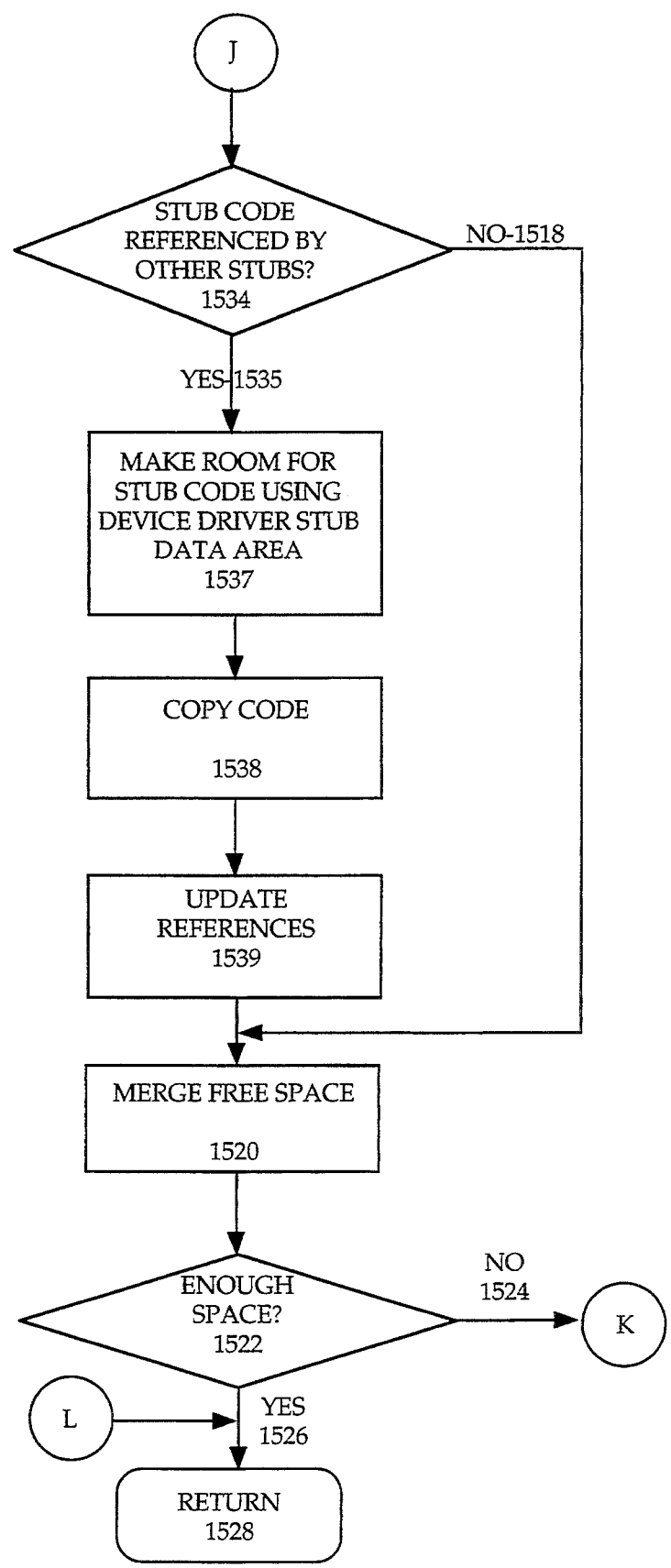

At processing block 807, the header of the DDIB of the newly installed card is read. Decision block 809 tests whether or not the device driver stub for the newly installed card still resides in the computer system RAM based on the device driver stub unique identification. If the stub still resides there, then the device driver stub executable code does not need to be loaded again. Thus, if the stub is already resident, processing path 811 is taken to continuation bubble G of FIG. 11. If the stub is not still resident, processing path 812 is taken to decision block 810 where a test is made to determine whether the code for this device driver is resident in RAM because it is being used by another device driver stub. If the code is resident in RAM then processing path 814 is taken to decision block 821 where available space within device driver stub RAM area 505 is checked. If there is available RAM space for the device driver stub data and the size of the stub header, processing path 825 is taken to the bubble labeled B as illustrated in FIG. 11. If, in decision block 821, it is determined that there is not enough RAM space available, processing path 823 is taken to processing block 830 where the subfunction called "make room" of FIG. 15a–b is activated to reclaim system memory. From processing block 830, processing proceeds to decision block 832 where a test is made to determine whether sufficient system memory was reclaimed. If so, then path 834 is taken to bubble B as illustrated in FIG. 11. If, however, the make room subfunction was unable to reclaim sufficient system memory (i.e. insufficient system memory was set aside originally for device driver stubs), then processing path 833 is taken to processing block 824 where an error in driver loading processing is reported. Card insertion processing then terminates through the bubble labeled C as illustrated in FIG. 12.

Figure 14:
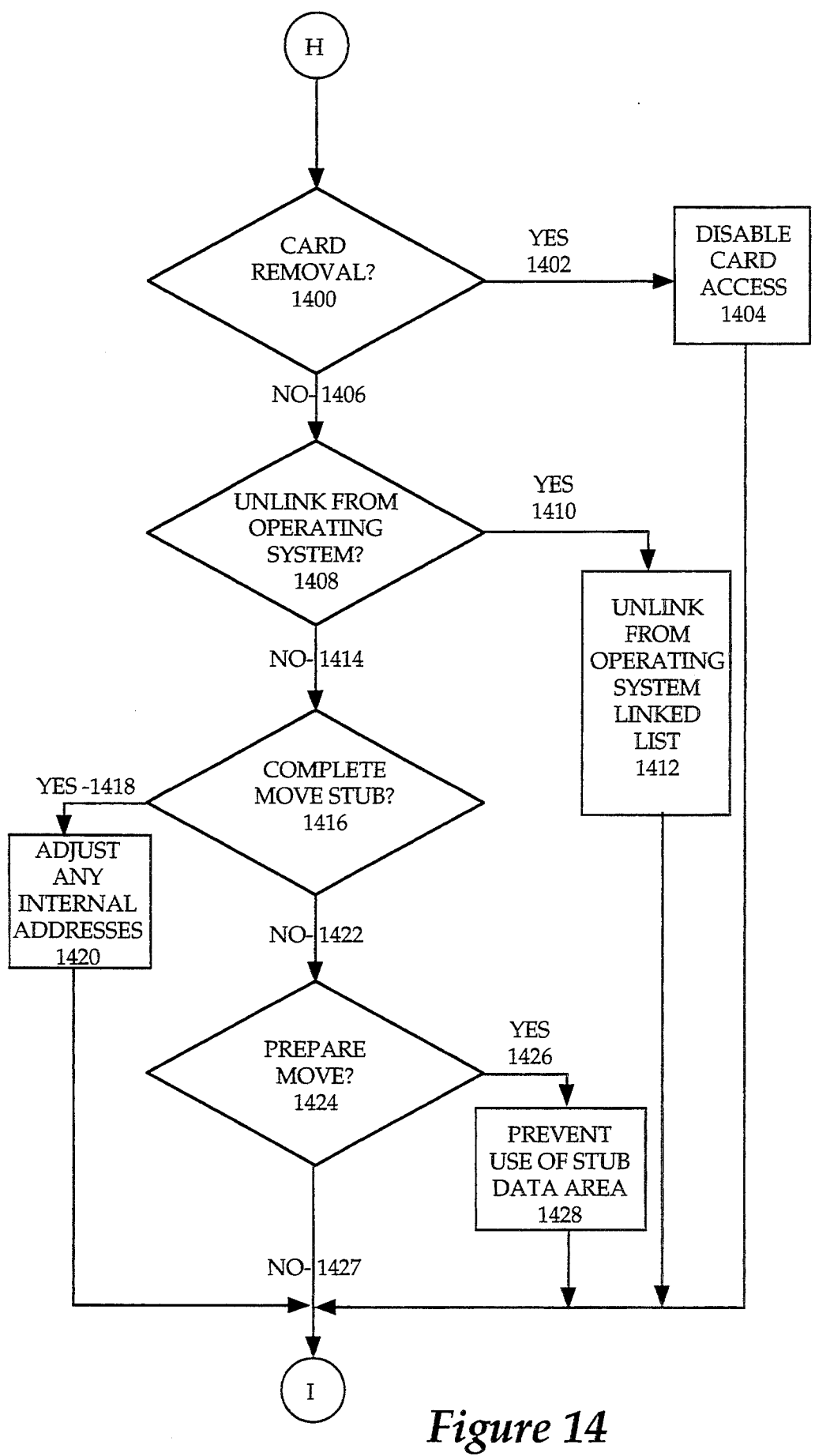

Referring again to decision block 810, if the device driver stub code for the newly installed feature card was not present in RAM, processing path 813 is taken to decision block 815. In decision block 815, a test is made to determine if there is enough space available in device driver stub RAM area 505 for the storage of the device driver stub executable code, the device driver stub data, and the size of the stub header. If enough RAM space is available, processing path 819 is taken to the bubble labeled B as illustrated in FIG. 11. If, however, as a result of the test made in decision block 815, it is determined that there is not enough RAM space available, processing path 817 is taken to processing block 830 where the make room subfunction of FIG. 14 is activated to reclaim system memory.

Referring now to FIG. 11, card insertion processing continues at the bubble labeled B. At this point, it has been determined that sufficient space is available in device driver stub RAM area 505 for the storage of the device driver stub for the newly inserted feature card. In processing block 827, a portion of the DDIB header from the newly installed card is copied into the preallocated device driver stub RAM area. In particular, fields 411, 413, 415, 417, and 419 of the DDIB header are copied into fields 630, 632, 634, 636, and 638 of the stub header, respectively. An additional portion of RAM in the device driver stub RAM area is reserved for device driver stub data in processing block 829. The size of this stub data area is specified by a parameter 427 in the DDIB header and copied to stub data field 676.

If the device driver stub is not resident in the device driver stub RAM area 505, processing path 911 is taken to processing block 913. In processing block 913, the device driver stub executable code is copied from the newly installed feature card to the preallocated device driver stub RAM area 505. The strategy and interrupt offsets are loaded in processing block 915 to properly reference the newly loaded code. The stub data field 678 is set to the device driver stub code length 423 of the DDIB (FIG. 4). Referring back to decision block 907 of FIG. 11, if the device driver stub is resident in the device driver stub RAM area 505, processing path 909 is taken to processing block 910 where the strategy and offset linkage is set to the previously loaded executable code. The stub data field 678 is then set to zero. In this manner, loading a previously loaded device driver stub will be prevented. Processing then continues at processing block 917.

At processing block 917, the remaining fields of the stub header area and stub data area within device driver stub RAM area 505 are initialized. Initialization of these areas includes loading linkage pointers, adapter and socket identification information, and the device driver unique stub identification. These areas may be loaded by transferring the corresponding information from the card resident DDIB header. A card insertion flag in the stub data is set in processing block 919 to indicate that the card is inserted into a socket and accessible to the computer system and the command field 680 is set to "initialize". Processing then continues at the bubble labeled E as illustrated in FIG. 12.

Referring now to FIG. 12, the device driver stub corresponding to the newly inserted card is activated in processing block 1009. As a result of the activation of the device driver stub, the device driver stub enables the activation of the full device driver code 309 resident on the newly installed card. Activation of the full card resident device driver code 309 is enabled and memory mapping to the newly installed card is allowed. Thus, the device driver stub provides a linkage between the computer system software and the card resident functionality.

If another device driver information block is present in the card memory area for the newly installed card, processing path 1013 is taken to the bubble labeled F as illustrated in FIG. 10 where the header for the subsequent device driver information block is read in processing block 807. Because feature cards may contain more than one set of functionality, more than one device driver per card may be present. If, however, no other device driver information block is present for the newly installed card, processing path 1015 is taken to termination bubble 1017 where card insertion processing terminates.

Figure 13:
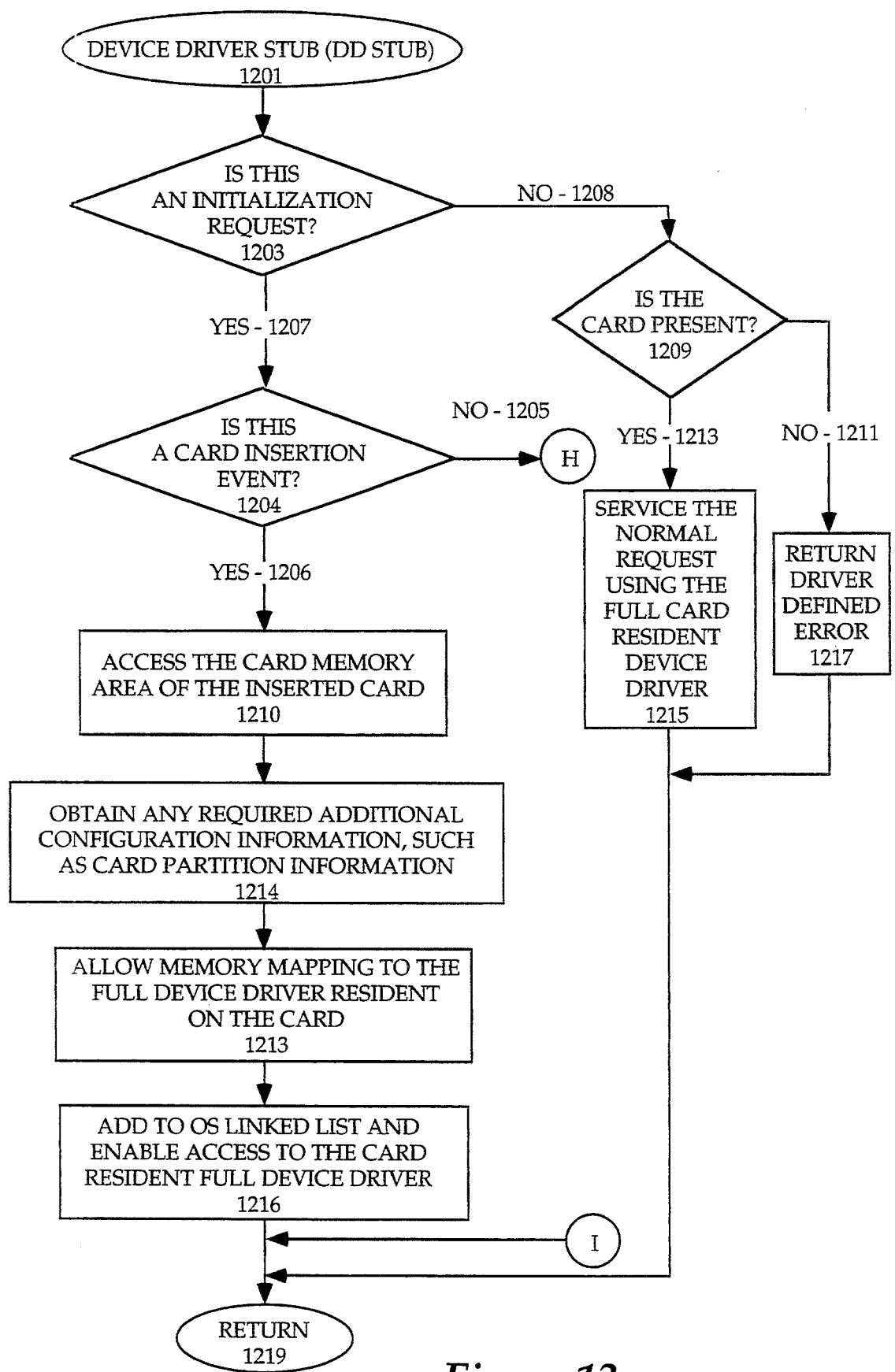

Referring now to FIGS. 13 and 14, the processing logic for each device driver stub is illustrated starting at bubble 1201 of FIG. 13. The device driver stub processing logic is activated in response to a card insertion or removal event. For example, device driver stub processing logic is executed in response to the activation of the device driver stub logic in processing block 1129 illustrated in FIG. 9 and in processing block 1009 illustrated in FIG. 12. The device driver stub processing logic is also executed when memory area 505 is reclaimed as illustrated in FIGS. 15a–16b.

Referring again to FIG. 13, if the device driver stub is being activated in order to initialize the operation of the device driver stub after being loaded, processing path 1207 is taken to decision block 1204. If the activation of the device driver stub is the result of a card insertion event, processing path 1206 is taken to processing block 1210 where the card memory area of the inserted card is accessed. Any necessary configuration or card partition information is obtained by the device driver stub in processing block 1214. Mapping to the full device driver resident on the feature card is enabled in processing block 1213. Access to the card resident full device driver is enabled in processing block 1216 and the newly installed device driver stub is added to the linked list of device drivers maintained by the operating system. Adding the newly installed device driver stub to this linked list is done in an operating system specific way. As a result of enabling access to the card resident full device driver, processing control may subsequently be transferred to the full card resident device driver where feature card functionality may be fully exploited. By executing the card resident full device driver, the full device driver executable code does not need to be copied to computer system random access memory for execution therein.

Referring back to decision block 1203, if the device driver stub is not activated for the purpose of initializing the device driver stub, processing path 1208 is taken to decision block 1209. Processing path 1208 is taken during the normal operation of the device driver stub after initialization has occurred. In this case, the presence of the card corresponding to the device driver stub is checked in processing block 1209. If the card corresponding to the device driver stub is still present and active, processing path 1213 is taken to processing block 1215 where a normal device driver request is serviced by the full card resident device driver. Upon completion of the normal request in processing block 1215, processing terminates at bubble 1219. If, however, the card has been removed, processing path 1211 is taken to processing block 1217 where an appropriate software error is returned to-the software requesting the access to the removed card. Processing then terminates at bubble 1219. If the device driver stub has been replaced, the operating system detects the error and returns an appropriate error reply.

Referring again to decision block 1204, if the device driver stub is not activated in response to a card insertion event, processing path 1205 is taken to bubble H as illustrated in FIG. 14.

Referring now to FIG. 14, processing begins at continuation bubble H. In decision block 1400 a test of command field 680 is made to determine whether this is a card removal event. If this is a card removal event, processing path 1402 is taken to processing block 1404 where access to the card resident full device driver is disabled in response to the removal of the card. In this manner, computer system software is prevented from inadvertently attempting to access a removed card. Processing then continues to bubble I as illustrated in FIG. 13.

Referring again to decision block 1400 of FIG. 14, if this is not a card removal event, then processing path 1406 is taken to decision block 1408 where a test is made of command field 680 to determine whether the device driver is to be removed from the linked list of the operating system. If the device driver is to be removed from the operating system linked list, processing path 1410 is taken to processing block 1412 where the device driver is removed from the linked list of the operating system. Processing then continues to bubble I as illustrated in FIG. 13.

Referring again to decision block 1408 of FIG. 14, if the device driver is not to be removed from the operating system linked list, then processing path 1414 is taken to decision block 1416 where a test is made of command field 680 to determine whether a move of the device driver stub has completed. If the device driver has been moved, processing path 1418 is taken to processing block 1420 where any internal addresses of the moved device driver stub are adjusted to compensate for the relocation. This includes adjusting any operating system links. Processing then continues to bubble I as illustrated in FIG. 13.

Referring again to decision block 1416 of FIG. 14, if a move of the device driver has not completed, then processing path 1422 is taken to decision block 1424 where a test is made of command field 680 to determine whether a preparation for a move of the device driver stub is required. If the device driver is to be moved, processing path 1426 is taken to processing block 1428 where the use of the stub data area is disabled during the device driver stub relocation. This includes disabling any access to the operating system linkage in the stub data area 630. Processing then continues to bubble I as illustrated in FIG. 13.

Referring again to decision block 1424 of FIG. 14, if the device driver is not to be moved, then processing continues to bubble I as illustrated in FIG. 13.

Referring now to FIGS. 15a–b, the make room subfunction 1500 is illustrated. Make room 1500 is activated from processing block 830 illustrated in FIG. 10 when a device driver stub corresponding to a newly inserted feature card cannot be loaded into system memory because there is not enough system memory available to accommodate the device driver stub. Make room 1500 is responsible for reclaiming system memory occupied by device driver stubs corresponding to feature cards that are no longer inserted into slots thereby enabling the loading of the device driver stub corresponding to the newly inserted feature card.

Referring now to FIG. 15a, starting at decision block 1502, the linked list of system memory resident device driver stubs is traversed. If no more device driver stubs are listed in the linked list, then path 1504 is taken to continuation bubble L and termination bubble 1528 (FIG. 15b). Path 1504 is only taken if make room 1500 has not been successful in reclaiming sufficient system memory to permit the loading of the device driver stub corresponding to the newly inserted card.

Referring again to FIG. 15a, if more device driver stubs are listed in the linked list, then processing path 1506 is taken to decision block 1508 and the next device driver stub in the linked list is tested to determine whether its associated feature card is currently inserted in a card slot. If the feature card associated with the next device driver stub is not currently inserted in a card slot, then the gap corresponding to the portion of system memory occupied by this device driver stub may be reclaimed and used to load the device driver stub corresponding to the newly inserted feature card. If the gap can be reclaimed, then path 1512 is taken. If a card which uses the device driver stub is inserted, then the device driver stub cannot be relocated and path 1516 is taken to processing block 1536 and reclamation focus shifts to the next device driver stub in the linked list (if any).

Referring again to decision block 1508, if the card associated with the next device driver stub is not currently inserted in a card slot, then path 1512 is taken to processing block 1531 where command field 680 is set to signal that the device driver stub is to be unlinked from the operating system linked list before the gap can be reclaimed. Next, the device driver stub is activated in processing block 1532 and then, in process block 1533, the device driver stub is unlinked from the device driver stub loader linked list. Processing then continues to bubble J as illustrated in FIG. 15b.

Referring now to FIG. 15b, in decision block 1534, a test is made to determine whether the stub code is referenced by any other device driver stubs. If the code is not referenced by any other device driver stubs, then path 1518 is taken to process block 1520 where the function called "merge free space" is executed. Merge free space will be described in greater detail below in connection with FIGS. 16a–b. After the device driver stub has been moved, then processing continues to decision block 1522 where a test is performed to determine whether enough room has been made to permit the device driver loader to load the device driver stub corresponding to the newly inserted feature card. If there is enough room, then the subfunction has successfully made room and path 1526 is taken to termination bubble 1528. If, however, there still is not enough room, then path 1524 is taken to bubble K and processing block 1536 (FIG. 15a) and reclamation focus shifts to the next device driver stub in the linked list (if any).

Referring again to FIG. 15b and decision block 1534, if the stub code is referenced by any other device driver stubs, then path 1535 is taken to process block 1537 where room is made for the stub code using the device driver stub data area. The code is then copied in processing block 1538 and references from other stub headers to the moved code are updated to reflect the relocation (processing block 1539). Processing then continues to process block 1520 where the function merge free space is executed.

Processing in function make room continues until sufficient room in system memory has been reclaimed to permit the device driver loader to load the device driver stub corresponding to the newly inserted feature card device driver or until the process fails because the linked list of device driver stubs has been exhausted without reclaiming sufficient system memory. Note that the latter case will only occur if insufficient system memory to contain the device driver stubs was originally allocated.

Figure 16A:
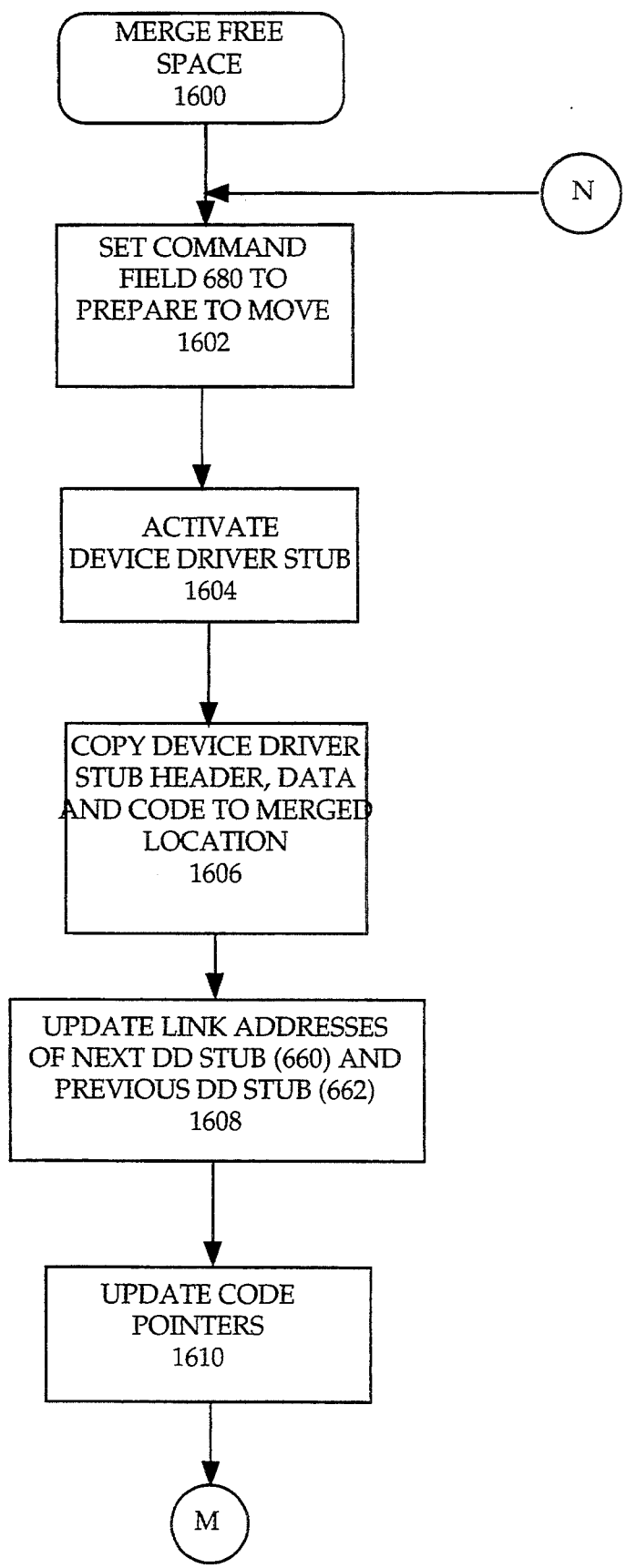
Figure 16B:
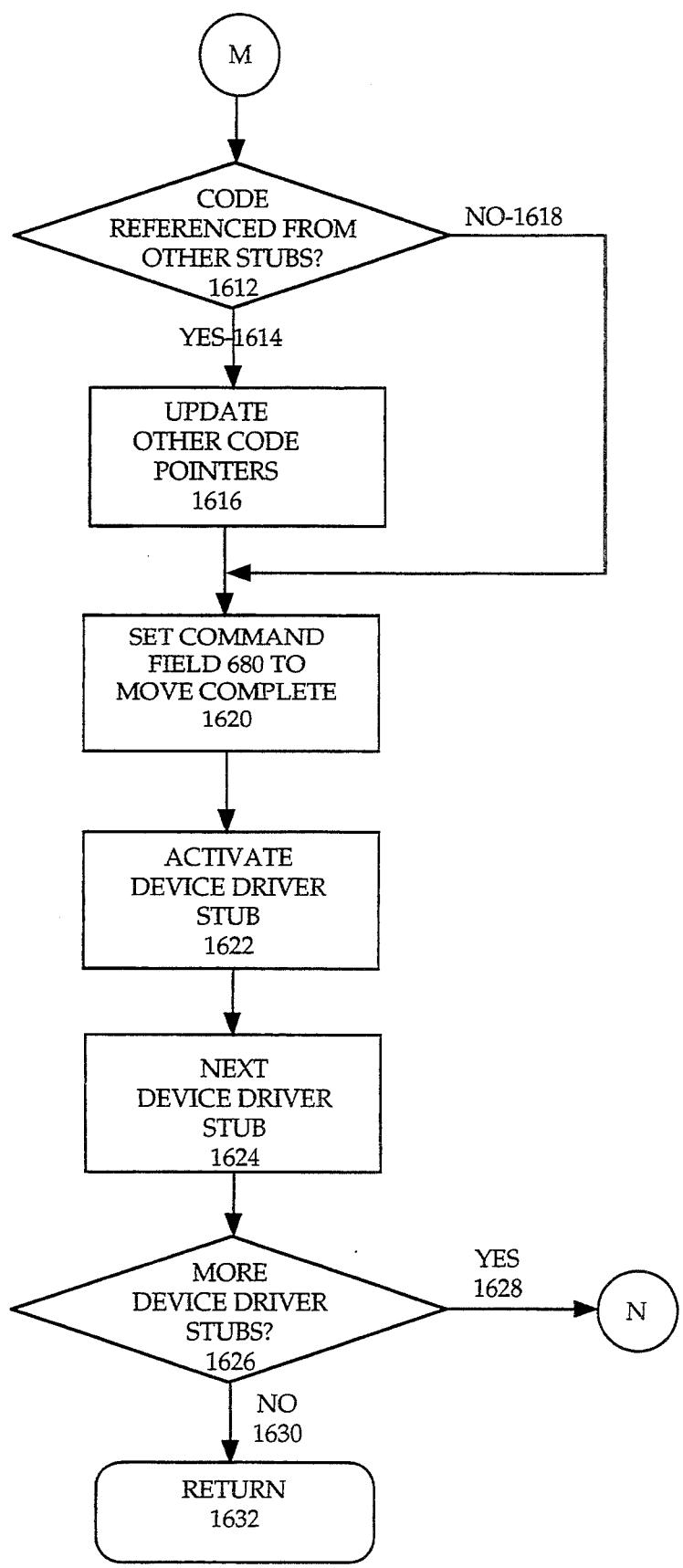

Referring now to FIGS. 16a–b, the merge free space subfunction 1600 is illustrated. Merge free space 1600 is activated from processing block 1520 illustrated in FIG. 15b when the memory space of a reclaimed device driver stub must be merged with the available device driver stub memory space. System memory is reclaimed when a newly inserted feature card with a device driver stub cannot be loaded into system memory because there is not enough system memory available.

Referring now to FIG. 16a, processing begins at the entry point to subfunction merge free space 1600 and proceeds to processing block 1602 where the command field 680 is set to indicate preparation for a move of the device driver stub. The device driver stub is then activated in processing block 1604 before the device driver stub header, data and code are copied to the merged location (processing block 1606). The link addresses of the next device driver stub and the previous device driver stub (660 and 662, respectively) are then updated in processing block 1608. Next, the code pointers for the device driver stub are updated in processing block 1610 to reflect the new location of the device driver code. Processing then continues to bubble M of FIG. 16b.

Referring now to FIG. 16b, processing proceeds sequentially from bubble M through several processing blocks to the return of the subroutine at termination bubble 1632. First, a test is made in decision block 1612 to determine whether the device driver stub code is referenced by any other stubs. If the code is referenced by other stubs, then path 1614 is taken to processing block 1616 where the code pointers of the other stubs are updated. The command field 680 is then set to indicate that the move has been completed (processing block 1620).

Referring again to decision block 1612, if the code is not referenced by other stubs, then path 1618 is taken to processing block 1620 where the command field 680 is set to indicate that the move has been completed. Once the command field 680 has been set to indicate that the move has completed, the device driver stub is then activated in processing block 1622. In processing block 1624, attention is focused on the next device driver stub to relocate (if any).

In decision block 1626, a test is made to determine whether there are any more device driver stubs to relocate. If there are no more device driver stubs, then processing terminates at termination bubble 1632. However, if there are more device driver stubs, then processing continues to bubble N as indicated in FIG. 16a.

The operation of the present invention is best illustrated by example. FIGS. 17a–e illustrate an embodiment of the present invention as it would operate through a series of card insertions and removals. In the example, a device driver loader within a computer system which has two card slots (sockets) responds as differently sized device driver stubs are inserted and removed from the slots. It will be obvious to one of ordinary skill in the art that the following examples are provided for didactic purposes and are therefore not intended to exhaust the myriad number of possible embodiments of the present invention.

Figure 17A:
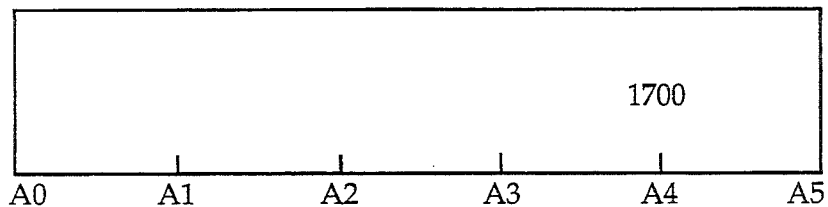
FIG. 17a–f illustrate the operation of the present invention in an example involving a computer system having two sockets.

Referring now to FIG. 17a, a section of computer system memory 1700 which has been set aside by the device driver loader to store device driver stubs is illustrated. Memory area 1700 extends from memory address A0 to memory address A5. Memory addresses A0 through A5 have been selected so that there is one "memory unit" between each address increment. It will be obvious to one of ordinary skill in the art that, for this example, the actual size of a memory unit is not material. Thus, the actual size of memory area 1700 is not important. What is important is that the size of memory area 1700 has been selected so that it is large enough to accommodate the device driver stubs of any two feature cards which will be used in the system at the same time.

In this example, while the computer system only has two slots, there are four feature cards. Feature Card A has the largest device driver stub, DD-A, which is three memory units in size. Feature Cards B and C have device driver stubs DD-B and DD-C, respectively. DD-B and DD-C are of equal size, two memory units. Finally, Feature Card D has device driver stub DD-D, which is one memory unit in size. Thus, DD-D is the smallest device driver stub of the four cards. For this example, it will be assumed that each feature card has only one device driver stub and that no cards share common device driver stub code. However, it will be obvious to one of ordinary skill in the art that the example can easily be extended so that any card has more than one device driver stub or that multiple cards may share common device driver stub code. In the former case, the combined device driver stubs for a particular feature card would occupy the area of the single device driver stub of each feature card of this example. In the latter case, the amount of memory space to be allocated for device driver stubs could be further reduced because some of the space would contain device driver stub code shared by more than one inserted feature card.

Figure 17B:
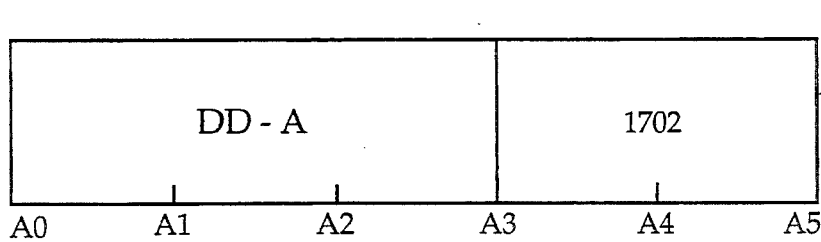

Referring now to FIG. 17b, memory area 1700 is depicted as it would appear after Card A, having device driver stub DD-A, has been inserted into Slot 1 of the computer system. Because device driver stub DD-A is three memory units in size, the device driver loader would load DD-A in the memory area extending from memory address A0 to memory address A3. Memory area 1702, which extends from memory address A3 to A5, would remain empty.

Figure 17C:
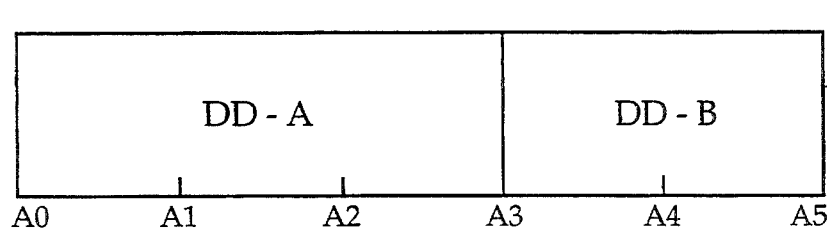

Referring now to FIG. 17c, memory area 1700 is depicted as it would appear after Card B, having device driver DD-B, was inserted into slot 2 of the computer system while card A remained inserted in Slot 1. There are two slots in the computer system, therefore device driver stub memory has been allocated to be the size of the two largest feature card device driver stubs. Therefore, in this example, memory area 1700 has been allocated to be five memory units in size. In this way, memory area 1700 can contain DD-A and DD-B simultaneously. These are the two largest device driver stubs, having a size of three memory units and two memory units respectively.

Note that if Card A or Card B were removed from their respective slots, the device driver stub corresponding to the removed card would remain resident in the memory area until the memory area needed to be reclaimed. In that case, if the card was reinserted while its device driver stub was still resident in memory, there would be no need for the device driver loader to load the device driver stub back into memory. The card insertion flag for the device driver stub would simply be updated to indicate that the card was now inserted into a socket and the device driver stub would be reactivated to establish the linkage once again to the full device driver residing on the card.

Figure 17D:
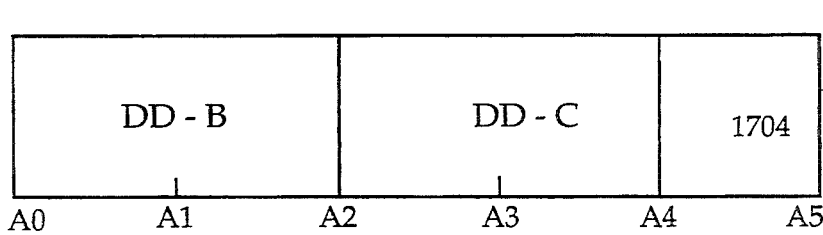

Referring now to FIG. 17d, memory area 1700 is shown as it would appear after Card A was removed from slot 1 and replaced with Card C. In this case, a portion of memory area 1700 equal in size to the device driver stub of Feature Card C (two memory units) would have to be reclaimed to make room for device driver stub DD-C of Feature Card C. Therefore, since Card B remained in Slot 2, device driver stub DD-B would first be moved from the portion of memory area 1700 which extends from memory address A3 through memory address A5 to the portion of memory area 1700 which extends from memory address A0 through A2. DD-C would then be loaded by the device driver loader in the area extending from memory address A2 through memory address A4. Memory area 1704, which extends from memory area A4 to memory area A5, would not be used.

Figure 17E:
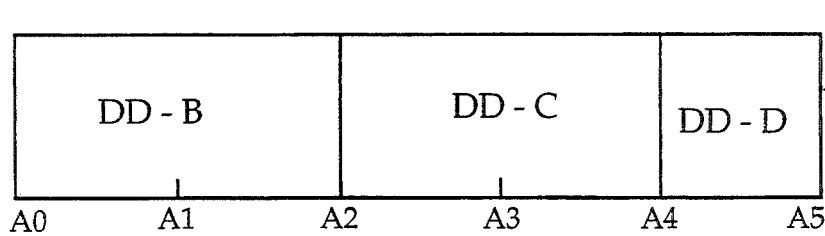

Referring now to FIG. 17e, if Card C in Slot 1 were then replaced with Card D, device driver stub DD-C would remain resident in system memory 1700 and device driver stub DD-D, of one memory unit in size, would be loaded by the device driver stub loader into the portion of memory extending from memory address A4 through memory address A5. Thus, while the device driver stub for Cards B, C and D would be resident in the memory area 1700, only device driver stubs DD-B and DD-D would correspond to cards currently occupying slots of the system.

Figure 17F:
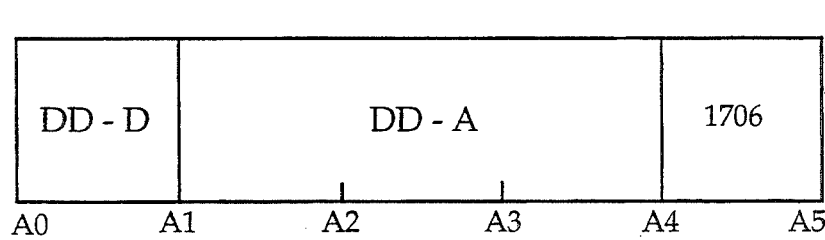

Referring now to FIG. 17f, memory area 1700 is illustrated as it would appear after Feature Card B was removed from slot 2 and replaced with Feature Card A. In this case, device driver stub DD-D (which corresponds to Feature Card D occupying slot 1) resides at the end of memory area 1700 so that the three memory unit size device driver stub DD-A (of Card A) will not fit in memory area 1700 after DD-D. Therefore, the device driver stub loader will merge free space in memory area 1700 by moving device driver stub DD-D to the beginning of system memory 1700. Device driver stub DD-A can then be loaded into system memory 1700 after DD-D. Thus, device driver stub DD-D is moved to the section of system memory 1700 which extends from memory address A0 to memory address A1. Device driver stub DD-A is then be loaded into the portion of system memory 1700 which extends from memory address A1 to memory address A4. Memory area 1706, which extends from memory address A4 to memory address A5, is unused.

Thus, a computer system having a method and apparatus for dynamically configuring device drivers of system resources is described.

While the method of the present invention has been described in terms of its presently preferred and alternate embodiments, those skilled in the art will recognize that the method of the present invention may be practiced with modification and alternation within the spirit and scope of the appended claims. The specifications and drawings are, accordingly, to be regarded in an illustrative rather than a restrictive sense.

I claim:

1. In a computer system having a processor, a system memory, and an interface for receiving a removable system resource, a process for dynamically configuring device drivers of removable computer system resources, said process comprising the steps of:

providing a resource memory in a removable system resource;

loading a device driver into said resource memory, said device driver for controlling said removable system resource;

loading a device driver stub into said resource memory, said device driver stub for enabling said device driver;

allocating a contiguous portion of system memory;

receiving an indication that said removable system resource has been coupled to said interface subsequent to initialization of said processor;

determining whether said allocated portion of system memory has an unused contiguous sub-portion sufficiently large to contain a copy of said device driver stub, an used sub-portion being system memory not containing a copy of a device driver stub corresponding to a different removable system resource coupled to said interface;

if said allocated portion of system memory does not have an unused sub-portion sufficiently large to contain said device driver stub copy, consolidating unused sub-portions until said unused sub-portions form a consolidated unused sub-portion of contiguous allocated memory sufficiently large to contain said copy of said device driver stub;

copying said device driver stub into said sufficiently large unused sub-portion;

executing said device driver stub from said system memory;

enabling access to said full device driver, said access being enabled by said device driver stub, said enabling step further including the step of allowing memory mapping to said device driver residing in said resource memory; and executing said full device driver from said resource memory.

2. The process as set forth in claim 1 further including the steps of:

determining whether said device driver stub already resides in system memory; and preventing said copying step if said device driver stub already resides in said system memory.

3. The process as set forth in claim 1 further including the steps of:

providing a card insertion flag in said system memory; and setting said card insertion flag when said removable system resource is coupled to said interface.

4. The process as set forth in claim 1 further including the steps of:

receiving an indication that a removable system resource has been decoupled from said interface;

disabling access to said full device driver, said access being enabled by said device driver stub.

5. The process as set forth in claim 4 further including the steps of:

providing a card insertion flag in said system memory; and resetting said card insertion flag when said removable system resource is decoupled from said interface.

6. In a computer system having a processor, a system memory, and an interface for receiving a removable system resource, a device for dynamically configuring device drivers of removable computer system resources, said device comprising:

a resource memory in said removable system resource, said resource memory comprising a device driver for controlling said removable system resource, said resource memory further including a device driver stub for enabling said device driver;

means for allocating a contiguous portion of system memory;

means for receiving an indication that a removable system resource has been coupled to said interface subsequent to initialization of said processor;

means for determining whether said allocated portion of system memory has an unused contiguous sub-portion sufficiently large to contain a copy of said device driver stub, an used sub-portion being system memory not containing a copy of a device driver stub corresponding to a different removable system resource coupled to said interface;

means for consolidating unused sub-portions such that if said allocated portion of system memory does not have an unused sub-portion sufficiently large to contain said device driver stub copy, consolidating said unused sub-portions until said unused sub-portions form a consolidated unused sub-portion of contiguous allocated memory sufficiently large to contain said copy of said device driver stub;

means for copying said device driver stub into said sufficiently large unused sub-portion;

means for executing said device driver stub from said system memory;

means for enabling access to said full device driver, said access being enabled by said device driver stub; and means for executing said full device driver from said resource memory.

7. The device as set forth in claim 6 further comprising:

means for determining whether said device driver stub already resides in system memory; and means for preventing said means for copying from copying if said device driver stub already resides in said system memory.

8. The device as set forth in claim 6 further comprising:

a card insertion flag in said system memory; and means for setting said card insertion flag when said removable system resource is coupled to said interface.

9. The device as set forth in claim 6 further comprising:

means for receiving an indication that a removable system resource has been decoupled from said interface;

means for disabling access to said full device driver, said access being enabled by said device driver stub.

10. The device as set forth in claim 9 further comprising:

a card insertion flag in said system memory; and means for resetting said card insertion flag when said removable system resource is decoupled from said interface.

11. In a computer system having a processor, a system memory, and an interface for receiving a removable system resource, a device for dynamically configuring device drivers of removable computer system resources, said device comprising:

a resource memory in said removable system resource, said resource memory comprising a device driver for controlling said removable system resource, said resource memory further including a device driver stub for enabling said device driver;

a memory allocator for allocating a contiguous portion of system memory;

a coupling indicator for receiving an indication that said removable system resource has been coupled to said interface subsequent to initialization of said processor;

a gap tester for determining whether said allocated portion of system memory has an unused contiguous sub-portion sufficiently large to contain a copy of said device driver stub, an used sub-portion being system memory not containing a copy of a device driver stub corresponding to a different removable system resource coupled to said interface;

a consolidator for consolidating unused sub-portions such that if said allocated portion of system memory does not have an unused sub-portion sufficiently large to contain said device driver stub copy, said consolidator consolidates said unused sub-portions until said unused sub-portions form a consolidated unused sub-portion of contiguous allocated memory sufficiently large to contain said copy of said device driver stub;

stub copier for copying said device driver stub into said sufficiently large unused sub-portion;

stub executor for executing said device driver stub from said system memory;

access enabler for enabling access to said full device driver, said access being enabled by said device driver stub, said access enabler further including a memory mapper for allowing memory mapping to said full device driver residing in said resource memory; and full device driver executor for executing said full device driver from said resource memory.

12. The device as set forth in claim 11 further comprising:
- a stub tester for determining whether said device driver stub already resides in said system memory; and
- a copy stopper for preventing said means for copying from copying if said device driver stub already resides in said system memory.

13. The device as set forth in claim 11 further comprising:
- a decoupling indicator for receiving an indication that a removable system resource has been decoupled from said interface; and
- an access disabler for disabling access to said full device driver, said access being enabled by said device driver stub.

14. The device as set forth in claim 13 further comprising:
- a card insertion flag in said system memory; and
- a flag setter for resetting said card insertion flag when said removable system resource is decoupled from said interface.

15. The device as set forth in claim 11 further comprising:
- a card insertion flag in said system memory; and
- a flag setter for setting said card insertion flag when said removable system resource is coupled to said interface.

16. A computer system that dynamically configures device drivers of removable computer system resources, said computer system comprising:
- a processor;
- a system memory;
- a removable computer system resource, said removable system resource having a resource memory, said resource memory containing a device driver stub and a full device driver;
- an interface for receiving said removable system resources;
- means for allocating a contiguous portion of said system memory;
- means for receiving an indication that a removable system resource has been coupled to said interface;
- means for determining whether said allocated portion of system memory has an unused contiguous sub-portion sufficiently large to contain a copy of said device driver stub, an used sub-portion being system memory not containing a copy of device driver stub corresponding to a different removable system resource coupled to said interface;
- means for consolidating unused sub-portions such that if said allocated portion of system memory does not have an unused sub-portion sufficiently large to contain said device driver stub copy, consolidating said unused sub-portions until said unused sub-portions form a consolidated unused sub-portion of contiguous allocated memory sufficiently large to contain said copy of said device driver stub;
- means for copying said device driver stub processing logic into said sufficiently large unused sub-portion;
- means for executing said device driver stub from said system memory;
- means for enabling access to said full device driver, said access being enabled by said device driver stub, said means for enabling access to said full device driver further including means for allowing memory mapping to said full device driver residing in said resource memory; and
- means for executing said full device driver from said resource memory.

17. The computer system as set forth in claim 16 further comprising:
- means for determining whether said device driver stub already resides in said system memory; and
- means for preventing said means for copying from copying if said device driver stub already resides in said system memory.

18. The computer system as set forth in claim 16 further comprising:
- means for receiving an indication that a removable system resource has been decoupled from said interface; and
- means for disabling access to said full device driver, said access being enabled by said device driver stub.

* * * * *